United States Patent
Bleiweiss

(10) Patent No.: US 9,691,122 B2
(45) Date of Patent: Jun. 27, 2017

(54) FACILITATING DYNAMIC AND EFFICIENT PRE-LAUNCH CLIPPING FOR PARTIALLY-OBSCURED GRAPHICS IMAGES ON COMPUTING DEVICES

(71) Applicant: INTEL CORPORATION, Santa Clara, CA (US)

(72) Inventor: Avi I. Bleiweiss, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 14/578,318

(22) Filed: Dec. 19, 2014

(65) Prior Publication Data
US 2015/0379762 A1    Dec. 31, 2015

Related U.S. Application Data

(60) Provisional application No. 62/019,065, filed on Jun. 30, 2014.

(51) Int. Cl.
*G06T 1/20* (2006.01)
*G06T 11/60* (2006.01)
*G06T 15/30* (2011.01)

(52) U.S. Cl.
CPC ............... *G06T 1/20* (2013.01); *G06T 15/30* (2013.01); *G06T 11/60* (2013.01)

(58) Field of Classification Search
CPC .................................................... G06T 15/30
See application file for complete search history.

(56) References Cited

U.S. PATENT DOCUMENTS

| | | | |
|---|---|---|---|
| 8,266,550 B1* | 9/2012 | Cleron | G06F 1/1633 345/173 |
| 2009/0058848 A1* | 3/2009 | Howson | G06T 15/40 345/418 |
| 2010/0164969 A1* | 7/2010 | Sarel | G06T 15/40 345/545 |
| 2013/0154950 A1* | 6/2013 | Kvasnica | G06F 3/04845 345/173 |

* cited by examiner

*Primary Examiner* — Jeffery A Brier
(74) *Attorney, Agent, or Firm* — Blakely, Sokoloff, Taylor & Zafman LLP

(57) ABSTRACT

A mechanism is described for facilitating dynamic and efficient pre-launch clipping for partially-obscured images on computing devices. A method of embodiments, as described herein, includes receiving state data relating to an image having partially-obscured regions, where the image is capable of being processed on a graphics processing unit of a computing device, and evaluating the state data, where evaluating includes computation of at least one of visible pixels and invisible pixels of the image. The method may further include selecting the visible pixels to be included in processing of the image, where the invisible pixels are ignored. The method may further include processing the image based on the visible pixels.

24 Claims, 17 Drawing Sheets

FIG. 9A     SAMPLE COMMAND FORMAT
900
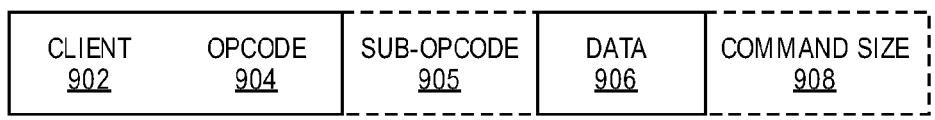
FIG. 9B     SAMPLE COMMAND SEQUENCE
910
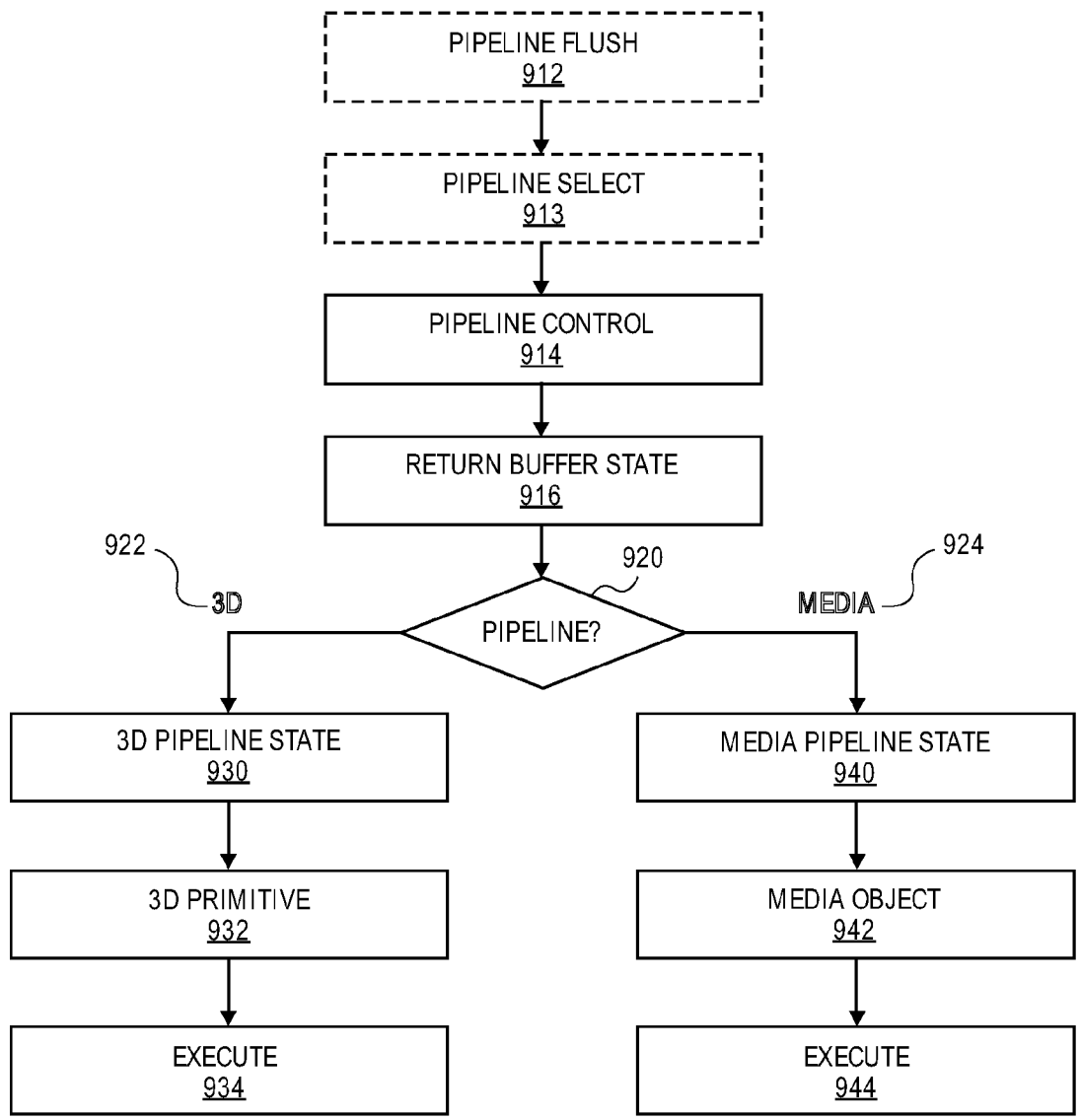

FACILITATING DYNAMIC AND EFFICIENT PRE-LAUNCH CLIPPING FOR PARTIALLY-OBSCURED GRAPHICS IMAGES ON COMPUTING DEVICES

CLAIM OF PRIORITY

This application claims the benefit of and priority to U.S. Provisional Patent Application No. 62/019,065, by Avi I. Bleiweiss, filed Jun. 30, 2014, the entire contents of which are incorporated herein by reference.

FIELD

Embodiments described herein generally relate to computers. More particularly, embodiments relate to a mechanism for facilitating dynamic and efficient pre-launch clipping for partially-obscured images on computing devices.

BACKGROUND

Display orientation changes and touch related swipe, pinch, and stretch events, etc., are fairly common experiences in mobile computing devices. These frequent and asynchronous occurrences often result in implicit, clipped two-dimensional (2D) images, leading to partially obscured pixel regions. In conventional techniques that employ graphics processing unit (GPU) runtime/drivers for computing, threads are consistently dispatched to execute kernels on all pixels, regardless of their visible state, where the action of display extent clipping is deferred, and performed in the succeeding render stage. Such conventional techniques are sub-optimal and inefficient in terms of power, computational resources, etc., in a dynamic model of constantly changing geometrical relations of an image to the display extent. Further, the aforementioned sensory events force repeated computation on the GPU and carry a rather significant overhead of attending to invisible pixels.

BRIEF DESCRIPTION OF THE DRAWINGS

Embodiments are illustrated by way of example, and not by way of limitation, in the figures of the accompanying drawings in which like reference numerals refer to similar elements.

FIG. 9A is a block diagram illustrating a graphics processor command format according to an embodiment and FIG. 9B is a block diagram illustrating a graphics processor command sequence according to an embodiment.

DETAILED DESCRIPTION

Figure 1:
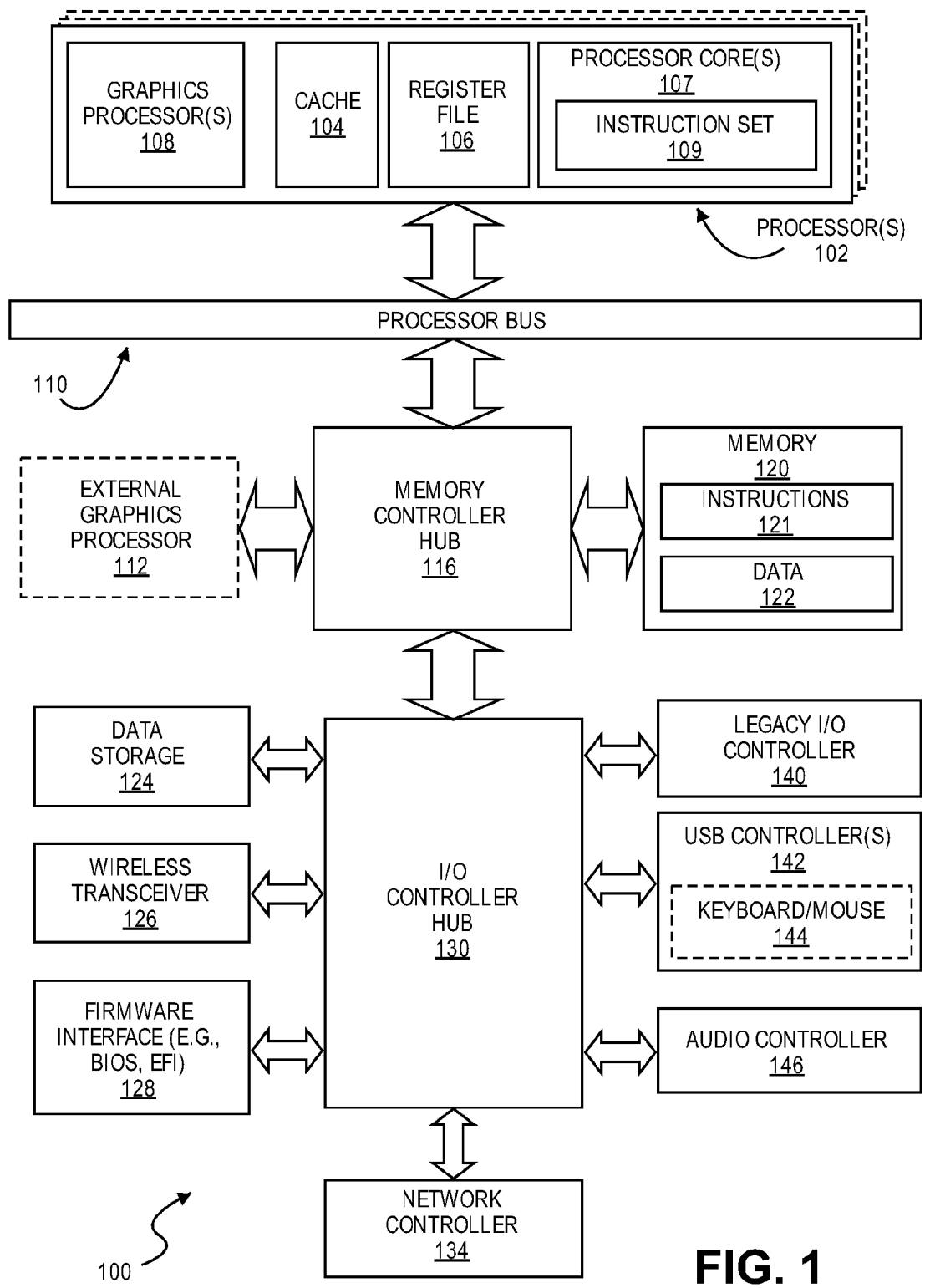
FIG. 1 is a block diagram of a data processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for an efficient pre-launch clipping for partially obscured images on behalf of GPUs in computing devices (e.g., mobile computing devices, such as smartphone, tablet computers, etc.) to facilitate an effective approach that specifies a relevant, active subspace of an image, pre-launching a GPU compute task. For example and in one embodiment, as opposed to the conventional technique of dispensing the already-constrained computing device resources on non-contributing pixels, embodiments provide a novel and innovative technique on the basis that the GPU compute runtime/driver abides by the display clip state in pre-launching a kernel. The runtime/driver may then dispatch the processing threads to solely operate on the visible sub-image, leading to a prospective gain of performance, for example, at power that is directly proportional to both the complexity of the imaging algorithm run and the number of elements that are clipped away.

It is contemplated that embodiments are not limited to any particular operating system or platform and that embodiment providing pre-launch clipping options may be supported by or employed at any number and types of operating systems and platforms, such as (but not limited to) RenderScript® compute platform on Android®, etc., to let a user programmatically select a region-of-interest, for compute. It is further contemplated that embodiments may be further expanded to be applied to a wider range of asynchronous clip event instances, such as embodiments may be employed at or used by various data parallel systems to potentially adapt and enable pre-launch clip optimization in their respective interfaces.

As aforementioned, conventional-techniques based on GPU computing runtime/driver provide for detaching from abiding by the state that is considered graphics-specific and are inefficient and thus severely limited to merely large static environments (e.g., desktop computing environment, etc.) that have self-sufficient GPU compute programs and do not work with smaller dynamic environments (e.g., mobile computing environment, etc.). Such techniques are particularly inefficient when they are encountered with clipped images, which forces the conventional runtime/drivers to perform repeated re-computations on all pixels (including those that are irrelevant) and defer the corresponding clipping post-launches at render time. Consequently, such techniques are considerably costly and power inefficient and severely ineffective when dealing with frequent touch events that lead to clipped images and are deeply rooted in user experience.

Embodiments provide for a GPU compute runtime/driver employing a mechanism to work with a device display clipping state such that it can validate active compute elements and invoke, if necessary, a more efficient pre-launch clipping. Embodiments provide for a technique that is appreciably efficient both in terms of power and resources and provides for a seamless and effective processing path.

Figure 2:
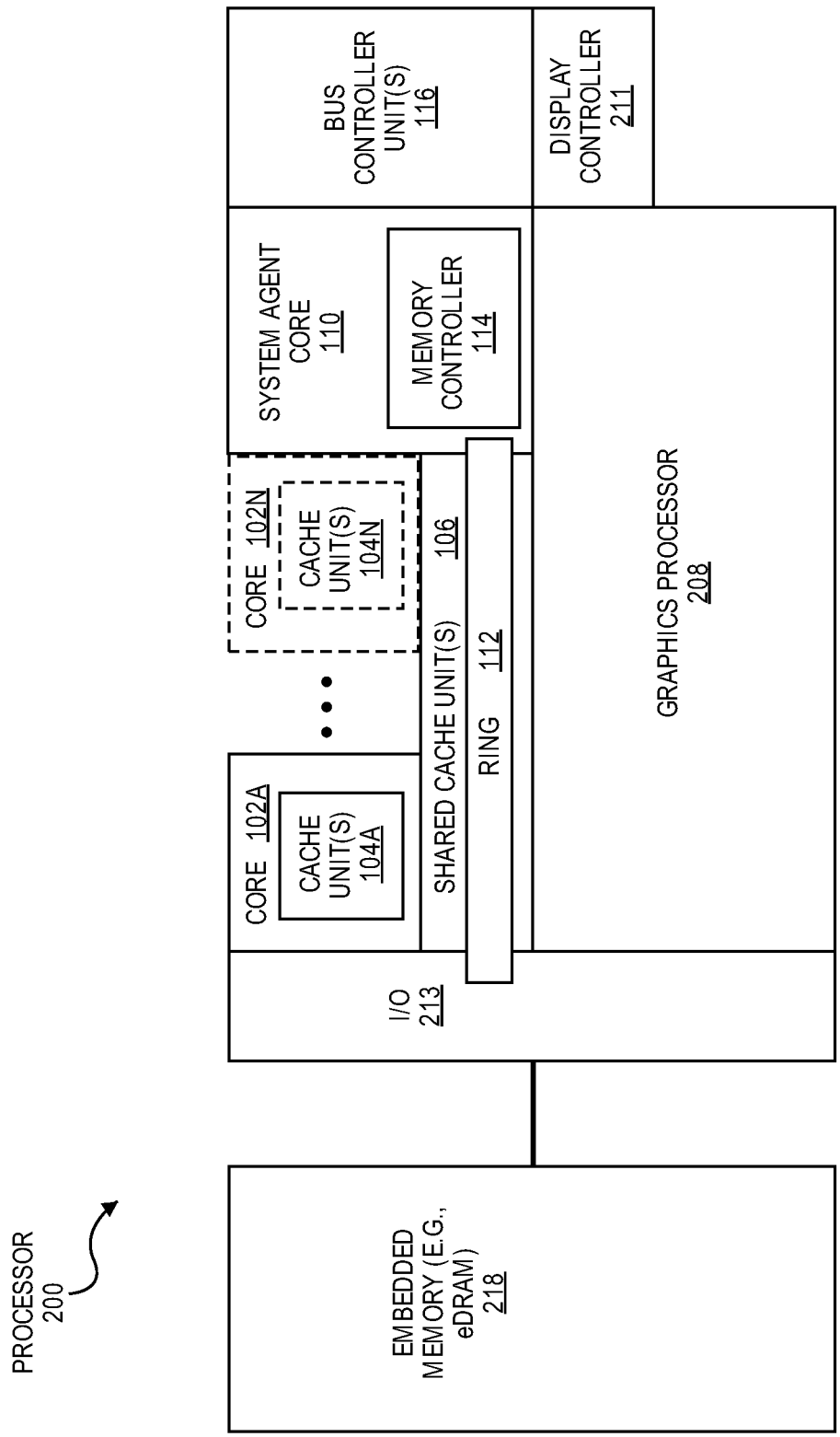
FIG. 2 is a block diagram of an embodiment of a processor having one or more processor cores, an integrated memory controller, and an integrated graphics processor.
Figure 3:
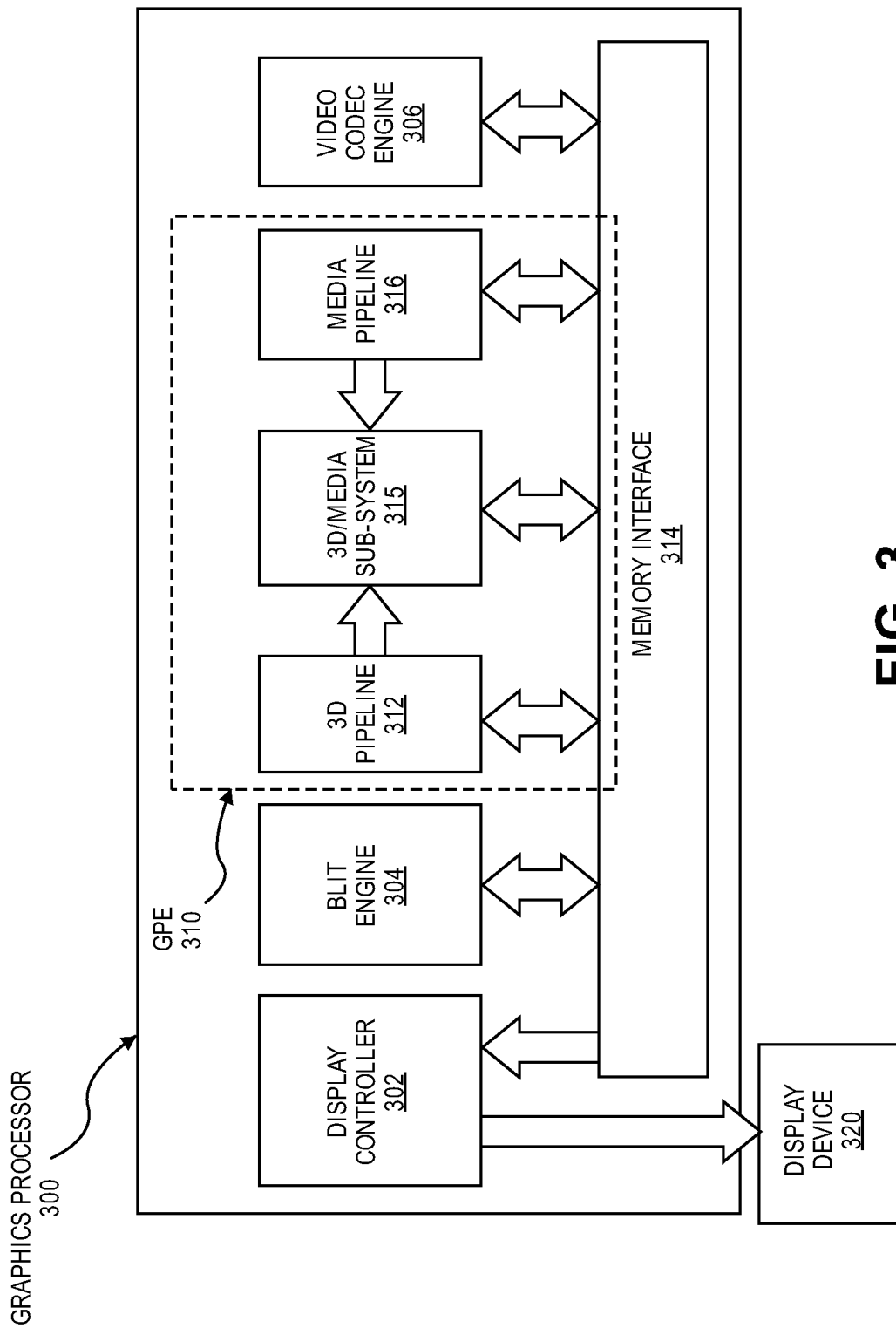
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 102A-N, an integrated memory controller 114, and an integrated graphics processor 208. The processor 200 can include additional cores up to and including additional core 102N represented by the dashed lined boxes. Each of the cores 102A-N includes one or more internal cache unit(s) 104A-N. In one embodiment each core also has access to one or more shared cached unit(s) 106.

The internal cache unit(s) 104A-N and shared cache unit(s) 106 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 106 and 104A-N.

The processor 200 may also include a set of one or more bus controller units 116 and a system agent 110. The one or more bus controller units manage a set of peripheral buses, such as one or more Peripheral Component Interconnect buses (e.g., PCI, PCI Express). The system agent 110 provides management functionality for the various processor components. In one embodiment, the system agent 110 includes one or more integrated memory controllers 114 to manage access to various external memory devices (not shown).

In one embodiment, one or more of the cores 102A-N include support for simultaneous multi-threading. In such embodiment, the system agent 110 includes components for coordinating and operating cores 102A-N during multi-threaded processing. The system agent 110 may additionally include a power control unit (PCU), which includes logic and components to regulate the power state of the cores 102A-N and the graphics processor 208.

The processor 200 additionally includes a graphics processor 208 to execute graphics processing operations. In one embodiment, the graphics processor 208 couples with the set of shared cache units 106, and the system agent unit 110, including the one or more integrated memory controllers 114. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 110.

In one embodiment a ring based interconnect unit 112 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 112 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 102-N and the graphics processor 208 use the embedded memory modules 218 as shared last level cache.

In one embodiment cores 102A-N are homogenous cores executing the same instruction set architecture. In another embodiment, the cores 102A-N are heterogeneous in terms of instruction set architecture (ISA), where one or more of the cores 102A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
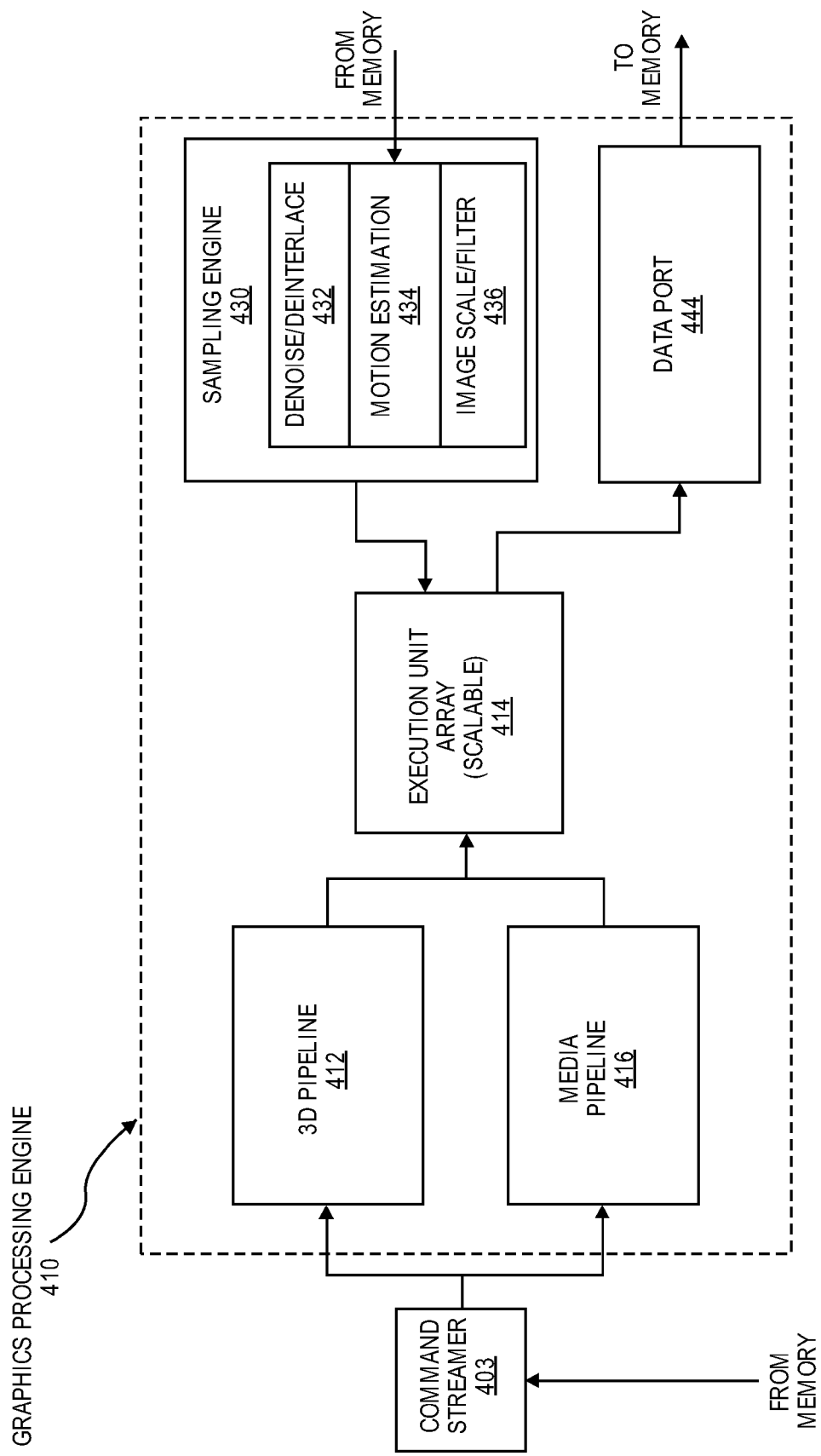
FIG. 4 is a block diagram of an embodiment of a graphics processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
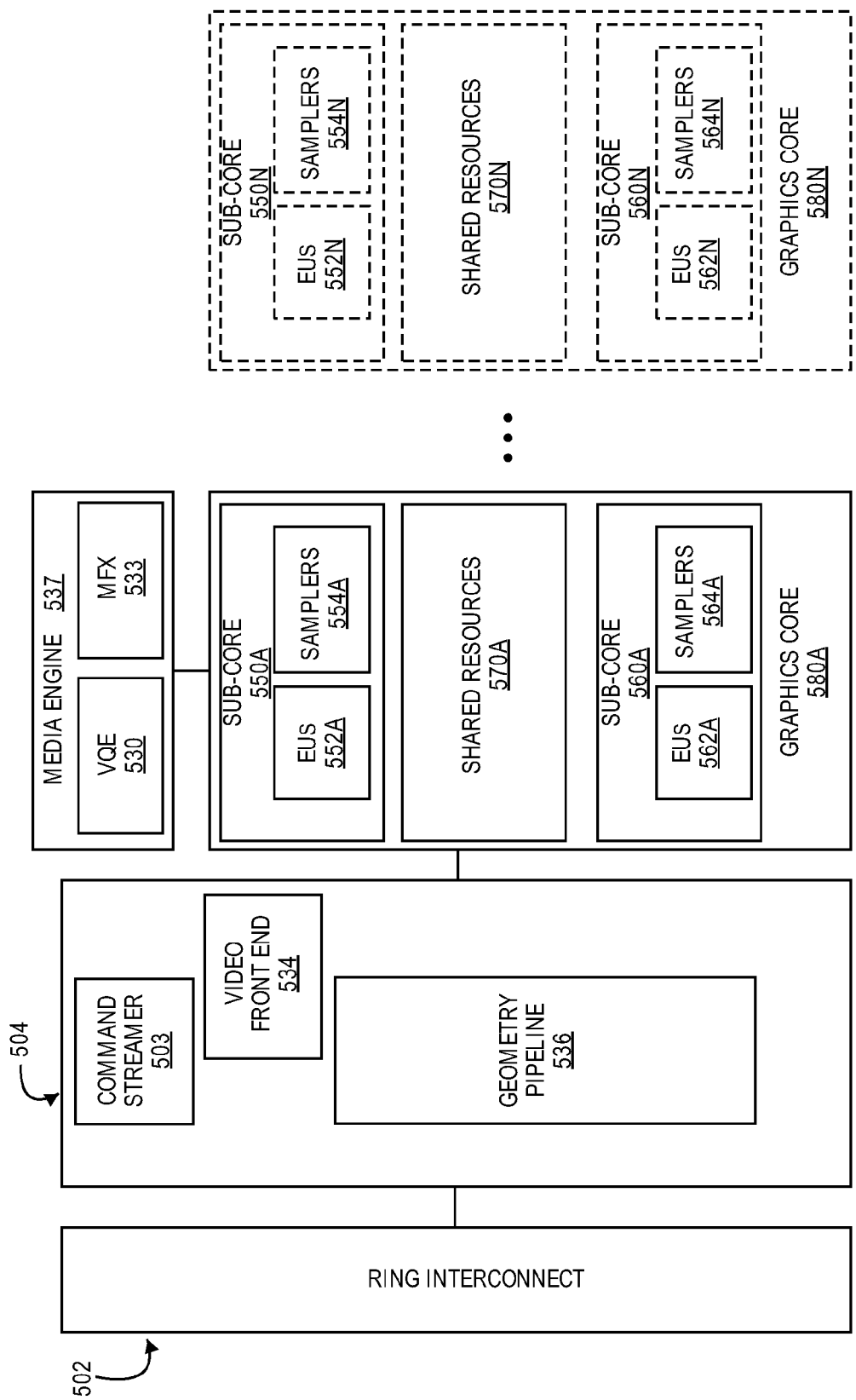
FIG. 5 is a block diagram of another embodiment of a graphics processor.
Figure 6:
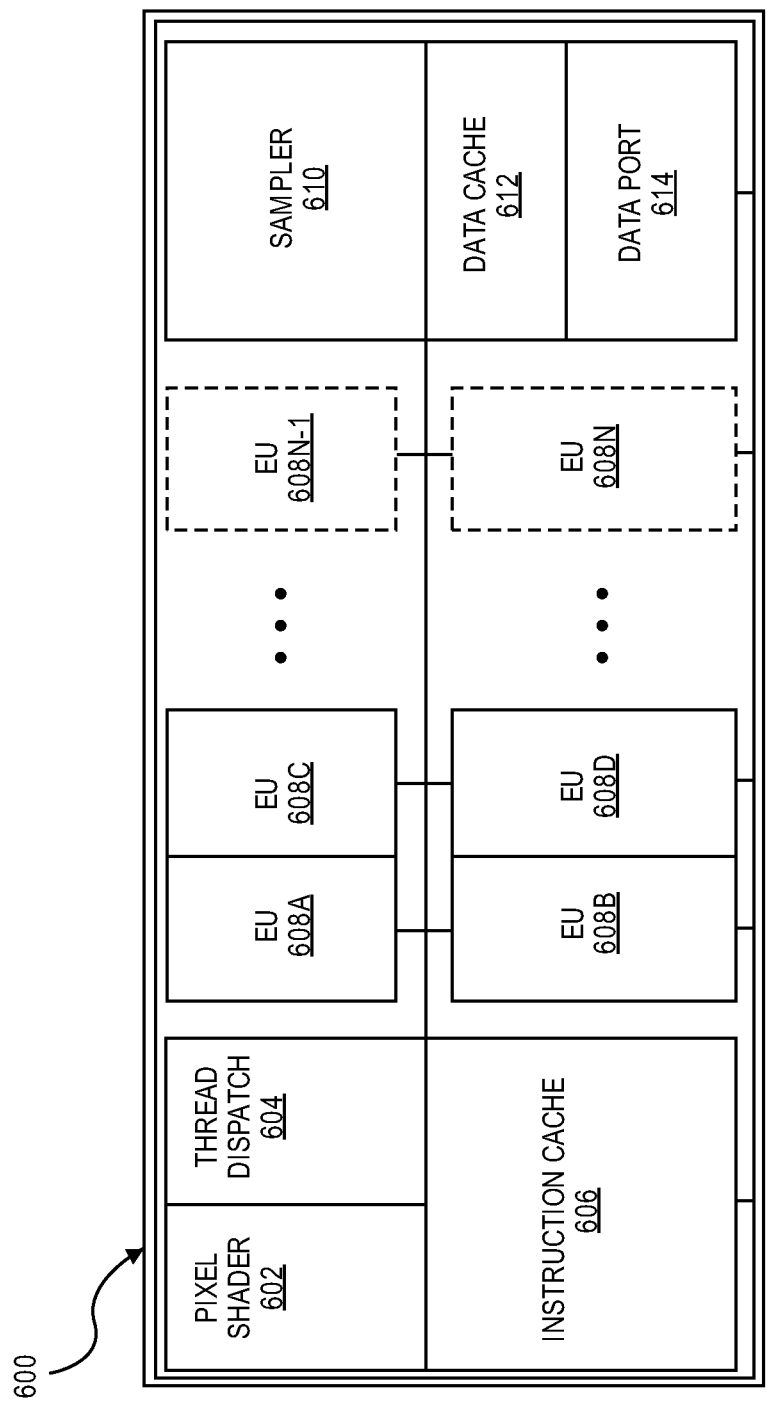
FIG. 6 illustrates thread execution logic including an array of processing elements employed in one embodiment of a graphics processing engine.
Figure 7:
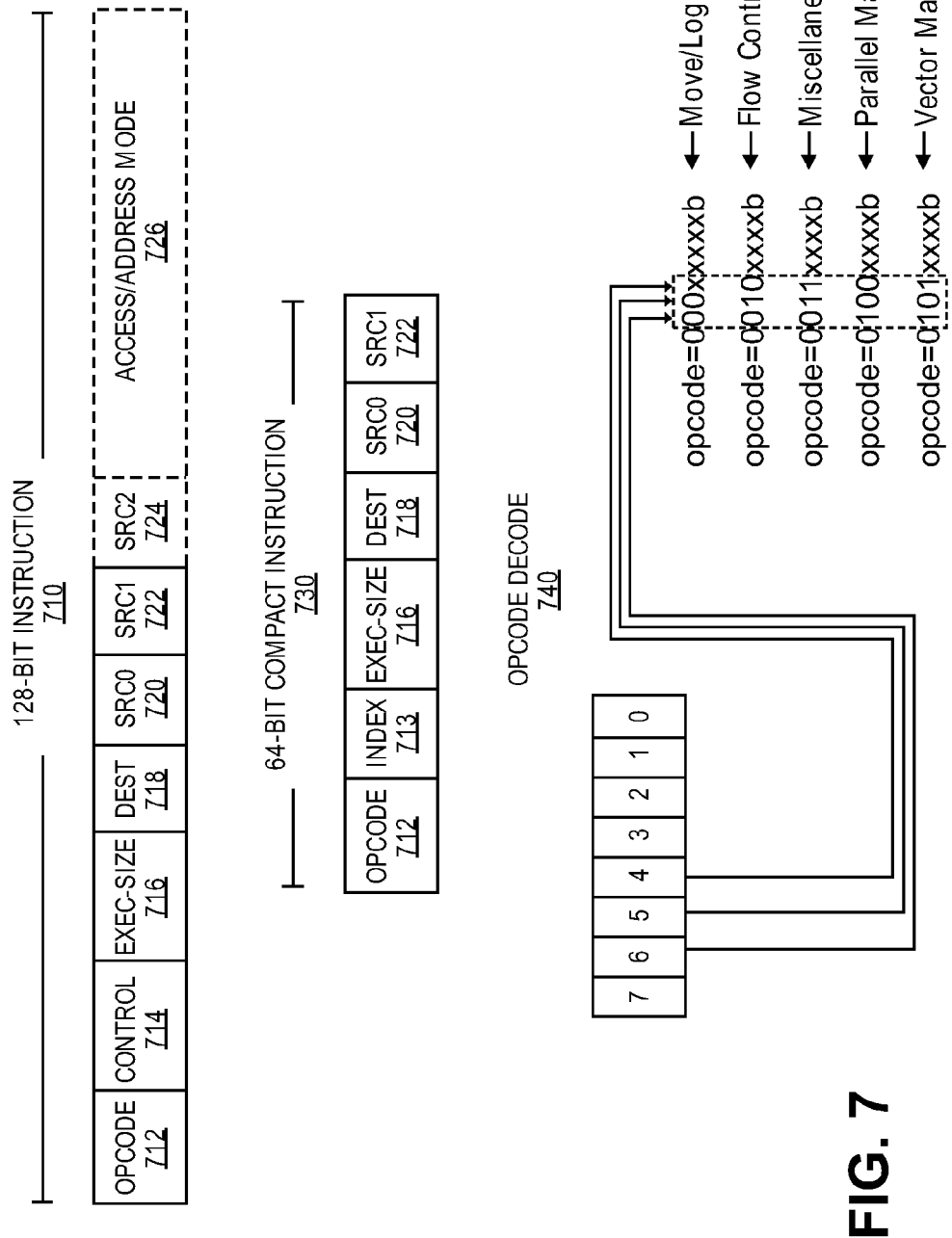
FIG. 7 is a block diagram illustrating a graphics processor execution unit instruction format according to an embodiment.

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quadword (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
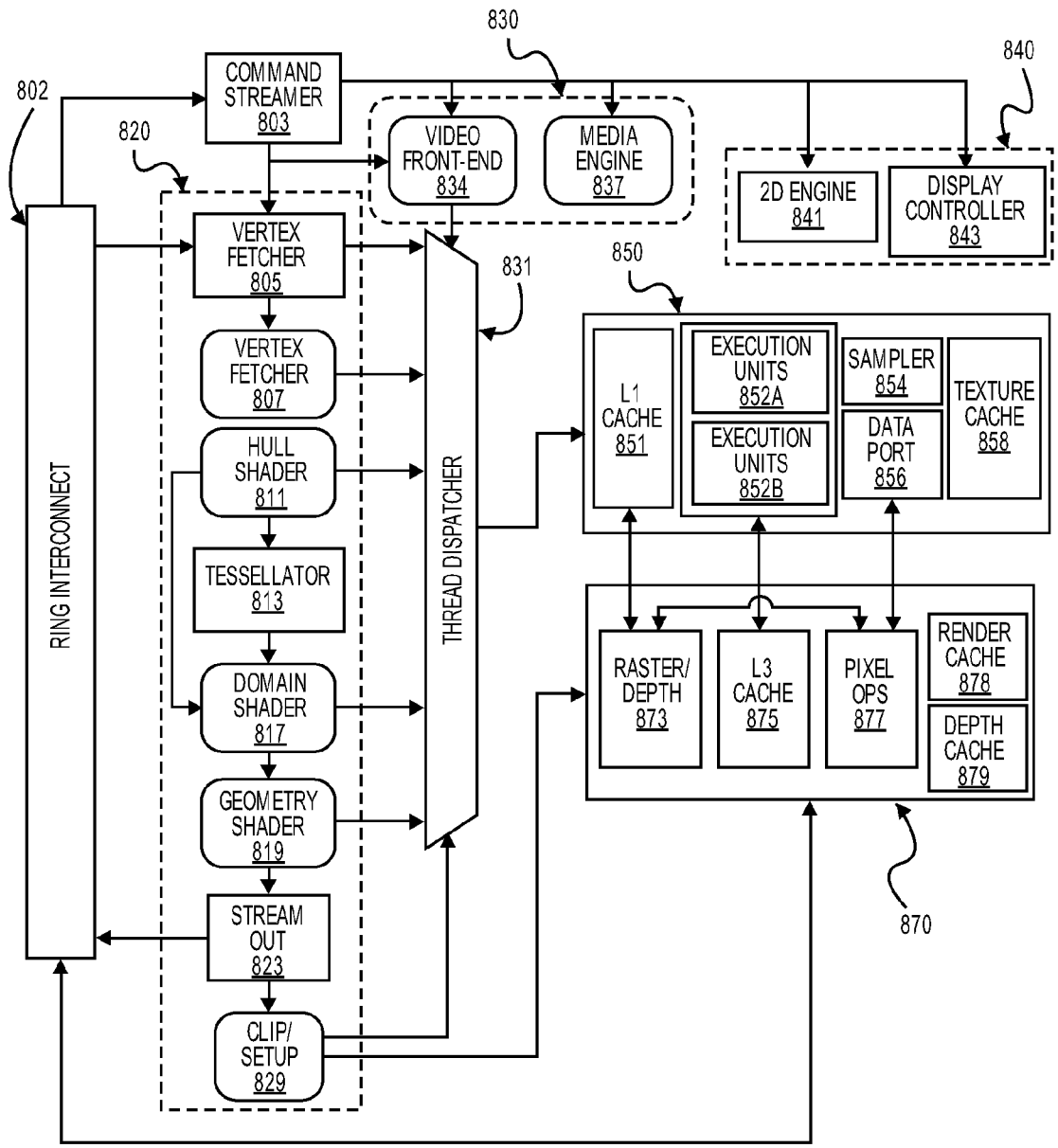
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL™) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
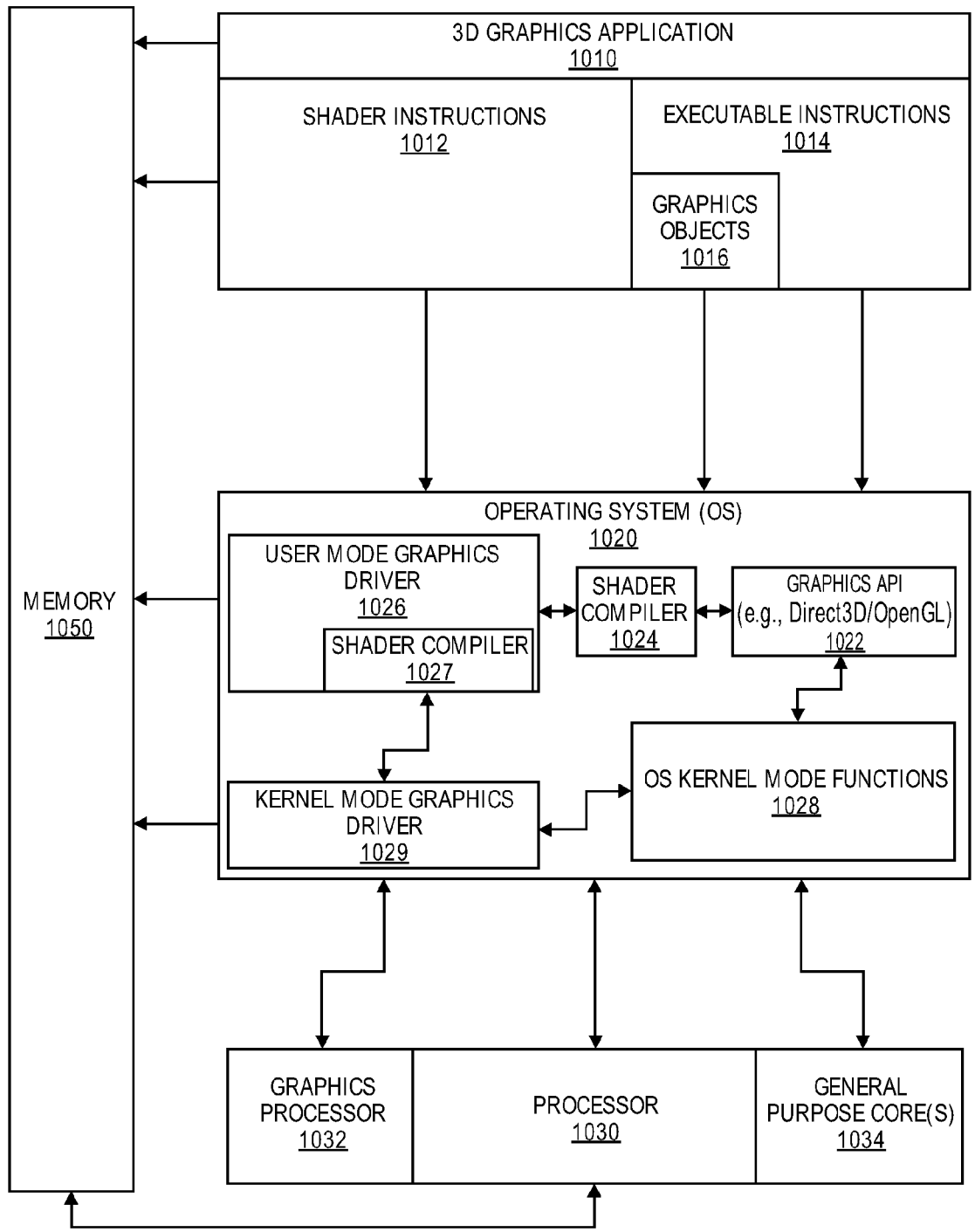
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Figure 11A:
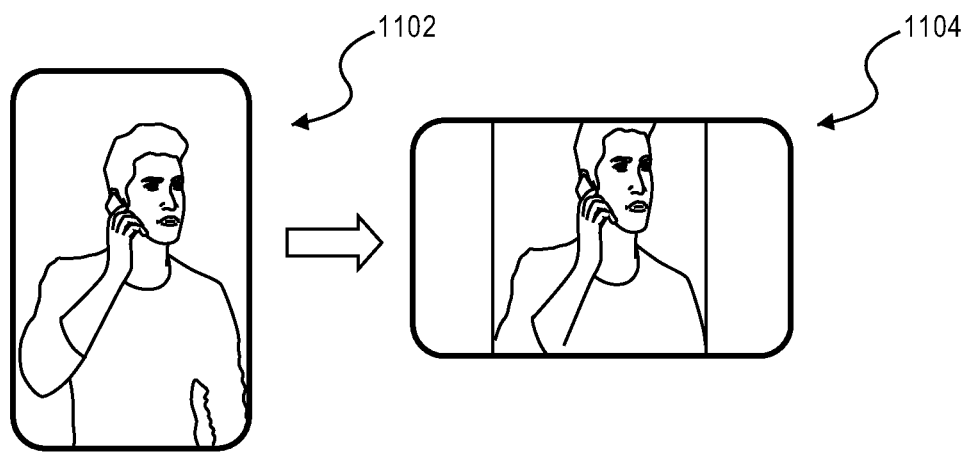
FIGS. 11A, 11B, 11C and 11D illustrate various use cases for which one or more embodiments may be applied.
Figure 11B:
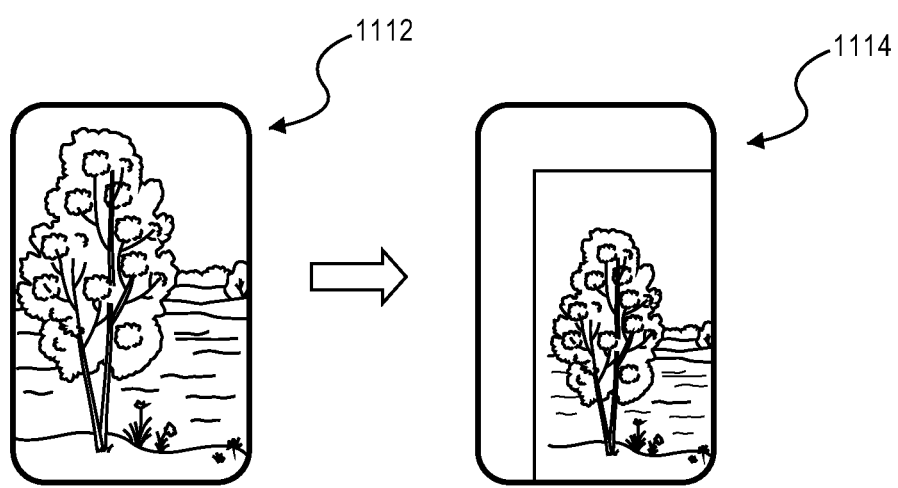
Figure 11C:
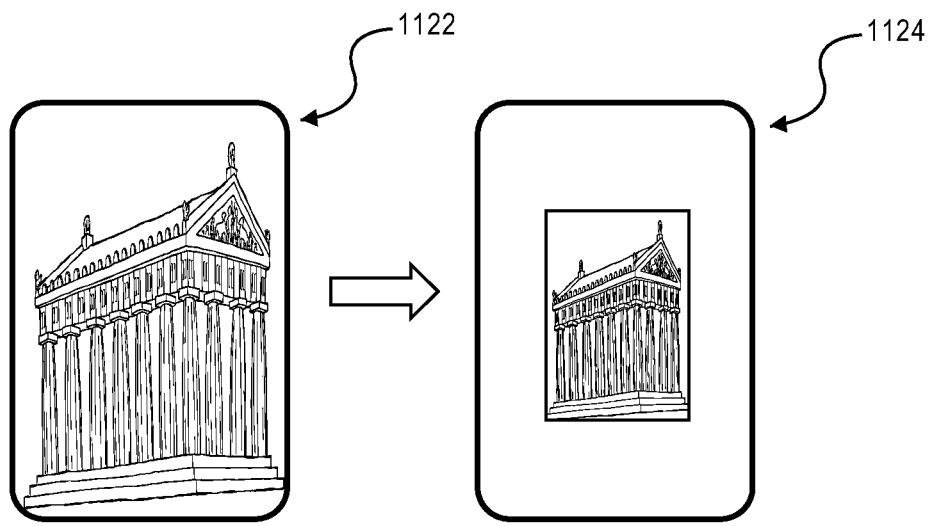
Figure 11D:
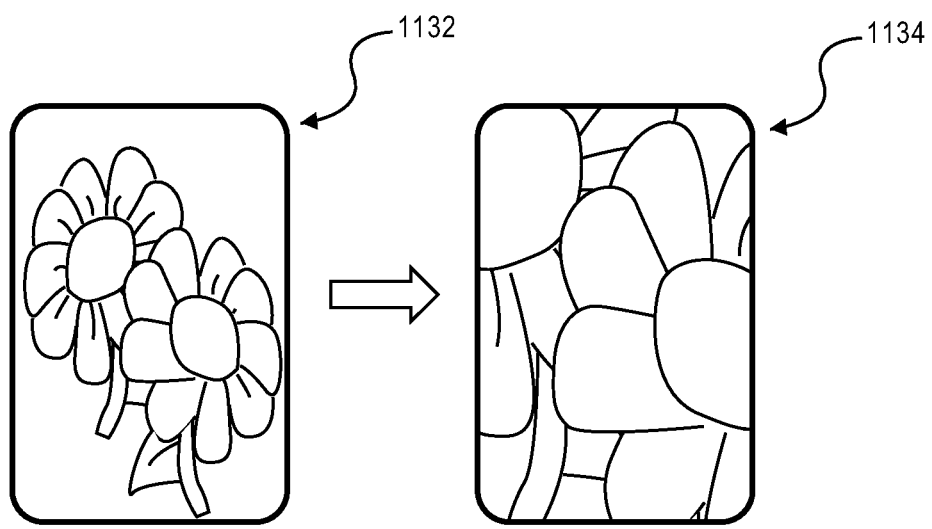
Figure 12:
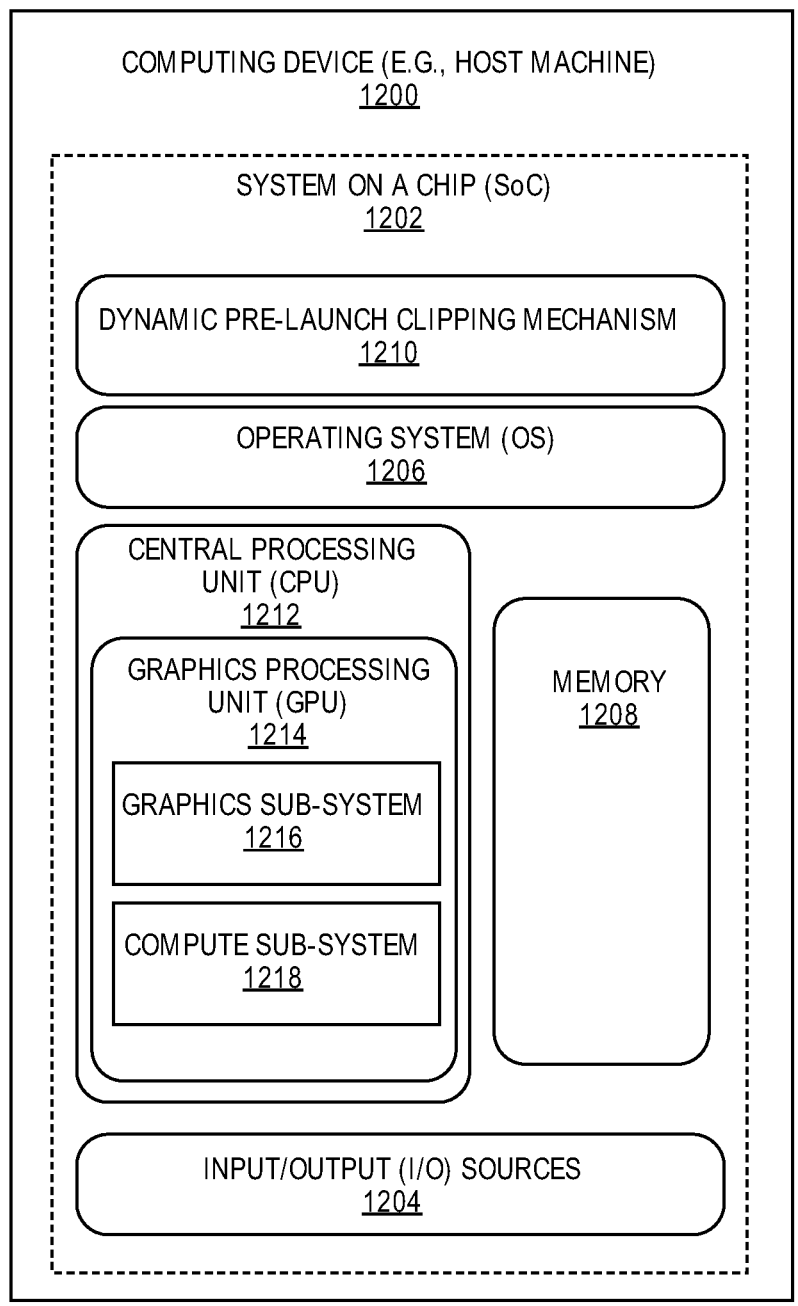
FIG. 12 illustrates a computing device employing a dynamic pre-launch clipping mechanism according to one embodiment.

FIGS. 11A, 11B, 11C and 11D illustrate various use cases for which one or more embodiments may be applied. For example, as illustrated, in FIG. 11A, on the left, an image is shown as fully visible in a portrait mode 1102 on a computing device (e.g., mobile computing device, such as smartphone, tablet computer, etc.), but the same image is shown as severely clipped when turned to a landscape mode 1104, on the right. This typically happens when a user turns a mobile device, such as smartphone, from portrait to landscape or vice versa. As is illustrated, when such movement of the computing device can severely clip a normally-shown image, it may point to a far less effective, post-launch clip action at render time Similarly, FIG. 11B illustrates touch swipe of a display screen of a computing device, such as a mobile computing device. For example and as illustrated, by performing touch swipe, a normal image 1112, on the left, may be clipped into a much smaller visible image 1114, on the right, where, with reference to this example, nearly 44% of the pixels are shown to be invisible FIG. 11C illustrates a touch pinch of a display screen of a computing device, such as a mobile computing device. For example and as illustrated, by performing touch pinch, a normal image 1122, on the left, may be clipped into a much smaller visible image 1124, on the right, where, with reference to this example, nearly 75% of the original pixels are transformed into a background FIG. 11D illustrates a touch stretch of a display screen of a computing device, such as a mobile computing device. For example and as illustrated, by performing touch stretch, a normal image 1132, on the left, may be clipped in magnifying the image 1134, on the right, where, with reference to this example, nearly 75% of the original pixels are obscured FIG. 12 illustrates a computing device 1200 employing a dynamic pre-launch clipping mechanism 1210 according to one embodiment. Computing device 1200 (e.g., mobile computing device) may be the same as data processing system 100 of FIG. 1 and accordingly, for brevity, many of the details stated above with reference to FIGS. 1-10 are not repeated here. Computing device 1200 may include a mobile computing device (e.g., smartphone, tablet computer, laptops, game consoles, portable workstations, etc.) serving as a host machine for hosting dynamic pre-launch clipping mechanism ("pre-launch mechanism") 1210 that includes any number and type of components to perform various tasks to facilitate efficient pre-launch clipping for GPUs in mobile devices, such as GPU 1214 at computing device 1200, as will be further described throughout this document. It is to be noted that throughout this document, terms like "graphics domain" may be referenced interchangeably with "graphics processing unit" or simply "GPU" and similarly, "CPU domain" or "host domain" may be referenced interchangeably with "computer processing unit" or simply "CPU".

Computing device 1200 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1200 may include mobile computing devices serving as communication devices, such as cellular phones including smartphones, personal digital assistants (PDAs), tablet computers, laptop computers, e-readers, smart televisions, television platforms, smart windows, head-mounted displays (HMDs) and other wearable devices (e.g., wearable glasses, watches, bracelets, smartcards, jewelry, clothing items, etc.), media players, etc.

For example, in one embodiment, computing device 1200 may include a mobile computing device employing an integrated circuit ("IC") integrating various hardware and/or software components of computing device 1200 on a single chip, such as system on a chip ("SoC" or "SOC") 1202. Such components may include any number and type of hardware and/or software components, such as (but not limited to) CPU 1212, GPU 1214 having graphics sub-system 1216 and compute sub-system 1218, memory 1208, pre-launch mechanism 1210, network devices, drivers, or the like, as well as input/output (I/O) sources 1204, such as touchscreens, touch panels, touch pads, virtual or regular keyboards, virtual or regular mice, ports, connectors, etc. Computing device 1200 may include operating system (OS) 1206 serving as an interface between hardware and/or physical resources of the computer device 1200 and a user. It is contemplated that CPU 1212 may include one or more processors, such as processor(s) 102 of FIG. 1, while GPU 1214 may include one or more graphics processors, such as graphics processor(s) 108 of FIG. 1. Further, as illustrated, GPU 1214 may be divided into graphics sub-system 1216 and compute sub-system 1218 to perform any number and type of tasks as described throughout this document.

As illustrated, in one embodiment, in addition to employing pre-launch mechanism 1210, computing device 1200 may further include any number and type of hardware components and/or software components, such as (but not limited to) CPU 1212, GPU 1214 having graphics sub-system 1216 and compute sub-system 1218, etc., memory 1208, network devices, drivers, or the like, as well as input/output (I/O) sources 1204, such as touchscreens, touch panels, touch pads, virtual or regular keyboards, virtual or regular mice, ports, connectors, etc. In one embodiment, volumetric mechanism 1210 may be hosted by GPU 1214. In another embodiment and as illustrated, volumetric mechanism 1210 may not be hosted by and that it may be hosted independently and elsewhere at computing device 100 while staying in communication with other components of computing device 100, such as graphics sub-system 1216 and/or compute sub-system 1218 of GPU 1214, CPU 1212, operation system 1206, and other software applications and/or components, etc., of computing device 1200.

Computing device 1200 may include operating system (OS) 1206 serving as an interface between hardware and/or physical resources of the computer device 1200 and a user. It is contemplated that CPU 1212 may include one or more processors, such as processor(s) 102 of FIG. 1, while GPU 1214 may include one or more graphics processors, such as graphics processor(s) 108 of FIG. 1. In one embodiment and as will be further descried with reference to the subsequent figures, volumetric mechanism 1210 may be in communication with graphics sub-system 1216 and/or compute sub-system 1218 of GPU 1214 to facilitate any number and type of tasks facilitating real-time rendering of volume for graphics images as is described through this document.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-10, some processes of the graphics pipeline as described above are implemented in software, while the rest are implemented in hardware. A graphics pipeline may be implemented in a graphics coprocessor design, where CPU 1212 is designed to work with GPU 1214 which may be included in or co-located with CPU 1212. In one embodiment, GPU 1214 may employ any number and type of conventional software and hardware logic to perform the conventional functions relating to graphics rendering as well as novel software and hardware logic to execute any number and type of instructions, such as instructions 121 of FIG. 1, to perform the various novel functions of volumetric mechanism 1210 as disclosed throughout this document.

As aforementioned, memory 1208 may include a random access memory (RAM) comprising application database having object information. A memory controller hub, such as memory controller hub 126 of FIG. 1, may access data in the RAM and forward it to GPU 1214 for graphics pipeline processing. RAM may include double data rate RAM (DDR RAM), extended data output RAM (EDO RAM), etc. CPU 1212 interacts with a hardware graphics pipeline, as illustrated with reference to FIG. 3, to share graphics pipelining functionality. Processed data is stored in a buffer in the hardware graphics pipeline, and state information is stored in memory 1208. The resulting image is then transferred to a display component or device, such as display device 320 of FIG. 3, for displaying. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1208 may comprise a pre-allocated region of a buffer (e.g., frame buffer); however, it should be understood by one of ordinary skill in the art that the embodiments are not so limited, and that any memory accessible to the lower graphics pipeline may be used. Computing device 1200 may further include input/output (I/O) control hub (ICH) 130 as referenced in FIG. 1, one or more I/O devices, etc.

CPU 1212 may include one or more processors to execute instructions in order to perform whatever software routines the computing system implements. The instructions frequently involve some sort of operation performed upon data. Both data and instructions may be stored in system memory 1208 and any associated cache. Cache is typically designed to have shorter latency times than system memory 1208; for example, cache might be integrated onto the same silicon chip(s) as the processor(s) and/or constructed with faster static RAM (SRAM) cells whilst the system memory 1208 might be constructed with slower dynamic RAM (DRAM) cells. By tending to store more frequently used instructions and data in the cache as opposed to the system memory 1208, the overall performance efficiency of computing device 1200 improves. It is contemplated that in some embodiments, GPU 1214 may exist as part of CPU 1212 (such as part of a physical CPU package) in which case, memory 1208 may be shared by CPU 1212 and GPU 1214 or kept separated.

System memory 1208 may be made available to other components within the computing device 1200. For example, any data (e.g., input graphics data) received from various interfaces to the computing device 1200 (e.g., keyboard and mouse, printer port, Local Area Network (LAN) port, modem port, etc.) or retrieved from an internal storage element of the computer device 1200 (e.g., hard disk drive) are often temporarily queued into system memory 1208 prior to their being operated upon by the one or more processor(s) in the implementation of a software program. Similarly, data that a software program determines should be sent from the computing device 1200 to an outside entity through one of the computing system interfaces, or stored into an internal storage element, is often temporarily queued in system memory 1208 prior to its being transmitted or stored.

Further, for example, an ICH, such as ICH 130 of FIG. 1, may be used for ensuring that such data is properly passed between the system memory 1208 and its appropriate corresponding computing system interface (and internal storage device if the computing system is so designed) and may have bi-directional point-to-point links between itself and the observed I/O devices. Similarly, an MCH, such as MCH 126 of FIG. 1, may be used for managing the various contending requests for system memory 1208 accesses amongst CPU 1212 and GPU 1214, interfaces and internal storage elements that may proximately arise in time with respect to one another.

I/O sources 1204 may include one or more I/O devices that are implemented for transferring data to and/or from computing device 1200 (e.g., a networking adapter); or, for a large scale non-volatile storage within computing device 1200 (e.g., hard disk drive). User input device, including alphanumeric and other keys, may be used to communicate information and command selections to GPU 1214. Another type of user input device is cursor control, such as a mouse, a trackball, a touchscreen, a touchpad, or cursor direction keys to communicate direction information and command selections to GPU 1214 and to control cursor movement on the display device. Camera and microphone arrays of computer device 1200 may be employed to observe gestures, record audio and video and to receive and transmit visual and audio commands.

Computing device 1200 may further include network interface(s) to provide access to a network, such as a LAN, a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.12b and/or IEEE 802.12g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1200 may vary from implementation to implementation depending upon numerous factors, such as price constraints, performance requirements, technological improvements, or other circumstances. Examples of the electronic device or computer system 1200 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 13:
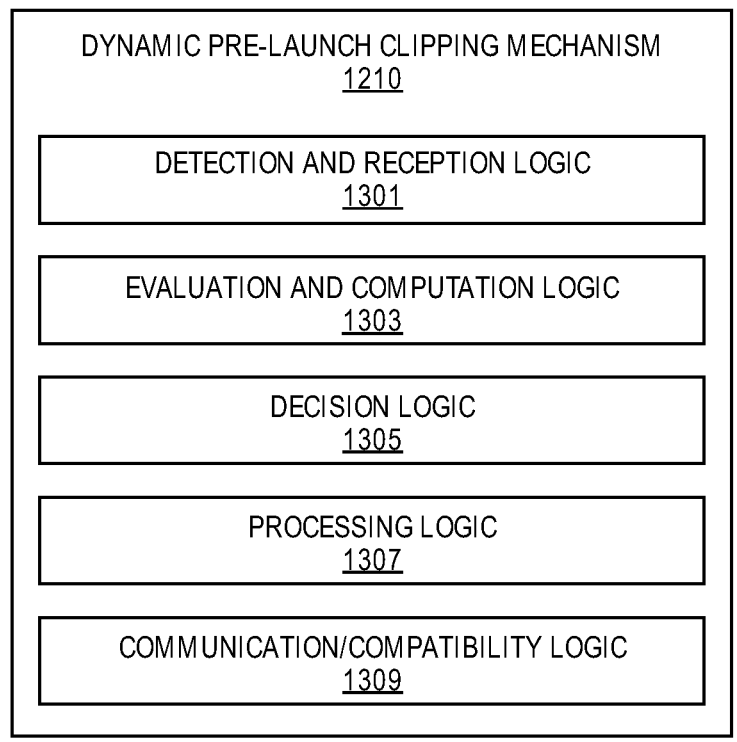
FIG. 13 illustrates a dynamic pre-launch clipping mechanism according to one embodiment.

FIG. 13 illustrates a dynamic pre-launch clipping mechanism 1210 according to one embodiment. In one embodiment, pre-launch mechanism 1210 may include any number and type of components/logic to perform various tasks to facilitate efficient pre-launch clipping for GPUs 1214 in mobile devices, such as computing device 1200. For example and in one embodiment, pre-launch mechanism 1210 may include (but not limited to): detection and reception logic 1301; evaluation and computation logic 1303; decision logic 1305; processing logic 1307; and communication/compatibility logic 1309. It is further illustrated and as aforementioned with reference to FIG. 12, pre-launch mechanism 1210 may be in communication with CPU, and/or GPU such that one or more tasks may be performed in communication with the CPU and/or GPU, such as CPU 1212 and GPU 1214 of computing device 1200 of FIG. 12. Further, terms like "obscured", "invisible", "unseen", "culled", and "scrapped" and their corresponding forms may be used interchangeably throughout this document.

As aforementioned, conventional techniques are inefficient and severely limited in that they promote excessive, unnecessary, and unintelligent processing of graphics data, such as computing and processing all pixels of all images regardless how an image is rendered, which leads to excessive misuse of system resources, such as time, power, memory, footprint, etc. This is particularly problematic with smaller or resource-constrained devices, such as mobile computers, etc. Such conventional techniques are particularly inefficient when they are encountered with clipped images, which forces the conventional runtime/drivers to perform repeated re-computations on all pixels (including those that are irrelevant) and defer the corresponding clipping post-launches, at render time. Consequently, such conventional techniques are considerably costly and power inefficient and severely ineffective when dealing with frequent touch events that lead to clipped images and are deeply rooted in user experience Embodiments provide pre-launch mechanism 1210 to work with a device display clipping state such that it validates active compute elements and invokes, if necessary, a more efficient pre-launch clipping. Embodiments provide for a technique that is efficient both in terms of power and resource consumption, and provides for a seamless and effective processing path.

In one embodiment, detection and reception logic 1301, in cooperation with communication/compatibility logic 1309, continue to receive display clip state (also referred to as "clip data", "state data", "display data" or simply "clip state") from the GPU of the corresponding computing device, such as GPU 1214 of computing device 1200 of FIG. 12. It is contemplated that, for example, on mobile computing devices, such as a smartphone and tablets, display touch events are fairly common, dynamic, and likely to trigger repeated, image clip events. It is further contemplated that a graphics sub-system, such as graphics sub-system 1216 of FIG. 12, of the GPU of such mobile devices may continuously observe and obtain display clip state of such events triggered by the user's actions as illustrated with respect to FIGS. 11A-11D.

In one embodiment, detection and reception logic 1301 may trigger the graphics sub-system of the GPU to communicate the display clip state from the graphics sub-system to the compute sub-system of the GPU, such as compute sub-system 1218 of GPU 1212 of FIG. 12. For example, in one embodiment, the graphics sub-system may be set to operate based on predetermined criteria such that the graphics sub-system may automatically communicate the display clip state to the compute sub-system on a continuous basis, periodically at predefined time-periods, upon occurrence of one or more events, and/or when actively triggered by detection and reception logic 1301, and/or the like.

This novel technique of communicating state data relating to the user actions from the graphics sub-system to the compute sub-system allows the compute sub-system to have the necessary and relevant data about all images, particularly partially-obscured images, which may then be used to consider and perform pre-launch clip processing as facilitated by pre-launch mechanism 1210.

In one embodiment, upon receiving display clip state at the compute sub-system, this state data is then received at evaluation and computation logic 1303 to perform evaluations and/or computations relating to the state data. For example and in one embodiment, evaluation and computation logic 1303 may consider the state data to determine whether the state data justifies pre-launch clip based on any number and type of factors, criteria, thresholds, etc. For example and in one embodiment, a predetermined threshold representing or including a percentage of culled pixels which may be used to match against the state data to determine whether, based on the state data and the threshold, a pre-launch clip process may be performed.

For example, a predetermined threshold may set a percentage-based criterion to suggest that unless at least 15% of the pixels are culled, no clip launch (as opposed to pre-launch clip) may be performed because any culling that affects less than 15% of the total pixels may be considered acceptable. In contrast, if 15% or more pixels are culled, as determined from the state data, then the image may considered reasonably clipped and thus, in this case, pre-launch clip may be justified. It is contemplated that 15% is merely used as an example for brevity, clarify, and ease of understanding that embodiments are not limited to any particular percentage or any percentage at all.

In one embodiment, upon evaluating and computing, evaluation and computation logic 1303 may recommend its decision to decision logic 1305 for further processing. Continuing with the previous example, upon comparing the state data relating to a partially-obscured image with the predetermined threshold, if the amount of culled pixels is determined to be less than 15%, then having failed the predetermined threshold, evaluation and computation logic 1303 may recommend to decision logic 1305 that no clip launch may be triggered. However, if, for example, upon comparing the information extracted from the state data with the predetermined threshold, evaluation and computation logic 1303 may determine that the percentage of the culled pixels in the partially-obscured image is more at least 15%, then evaluation and computation logic 1303 may recommend pre-launch clip to decision logic 1305.

In one embodiment, decision logic 1305 may receive any recommendations from evaluation and computation logic 1303 and select between no clip launch and pre-launch clip based on one or more recommendations. For example, in some embodiments, decision logic 1305 may override a recommendation based on any number and type of factors, such as the availability of bandwidth, system resources, etc. Upon receiving a recommendation from evaluation and computation logic 1303, such as to trigger no clip launch, decision logic 1305 may select the no clip launch and instruct processing logic 1307 to launch the process. In one embodiment, processing logic 1307, upon receiving the instructions, triggers the no clip launch and performs any relevant processes accordingly.

In one embodiment, in performing no clip launch, processing logic 1307 may process all the pixels of an image which may be triggered when the state data relating to the image fails to meet the predetermined threshold or criterion for triggering pre-launch clip. For example, as previously discussed, if the comparison of the state data and the threshold reveals that the image is not obscured at all, such as no culling of pixels is detected or that all pixels are utilized, or that the obscurity is acceptable, such as more than the acceptable percentage of the pixels are being used (e.g., continuing with the previous example, more than 85% of the pixels are being used or less than 15% of the pixels are culled, etc.), then no clip launch may be triggered as determined by evaluation and computation logic 1303, decided or selected by decision logic 1305, and facilitated or processed by processing logic 1307.

In one embodiment, if the state data of an image upon comparison with the predetermined threshold, as facilitated by evaluation and computation logic 1303, reveals that that state data relating to the image passes the threshold value such that the number of pixels being culled is more than acceptable number, then pre-launch clip may be triggered as determined by evaluation and computation logic 1303, decided or selected by decision logic 1305, and facilitated or processed by processing logic 1307.

In processing pre-launch clip, in one embodiment, processing logic 1307 may only need to process the pixels that are being utilized and not the ones that are determined to be culled. Stated differently, for example, if 44% percent of the pixels are culled during image display clipping (such as due to touch swipe in FIG. 11B), then, in one embodiment, merely 56% (e.g., 100%−44%=56%) of the pixels that are being utilized are put through any subsequent processes as facilitated by processing logic 1307, while the other 44% of the pixels that are culled (and thus not utilized) are not processed, saving considerable amount of processing time, resources, power, etc. Similarly, in some implementations, in using pre-launch clip as facilitated by processing logic 1307, an even greater amount of resources may be preserved when a higher percentage of pixels is culled, such as with reference to FIGS. 11C-11D, 75% of the pixels may not be processed due to being culled or obscured.

Further, in one embodiment, as illustrated with respect to FIG. 11C, a compute launch process, such as based on no clip launch or pre-launch clip, on the GPU may invoke a kernel, a collection of executed instructions, etc., that perform an image processing task in parallel using a number of threads, where each thread may be used to processing a pixel. For example, any number of computation threads may be launched simultaneously and in parallel across execution units for processing of pixels in a launch process. In one embodiment, in using the pre-launch clip process, none of the culled pixels may be processed which leads to processing of far fewer pixels than processing all the pixels and accordingly, fewer threads may be launched and, in return, valuable system resources may be preserved and/or used for other processes, such as other applications running on the system, etc.

It is to be noted that in communicating the state data relating to images from the graphics sub-system to the compute sub-system, the amount of pixels being utilized or culled is determined which may then be used to perform the efficient pre-launch clip-based processing. In one embodiment, upon completing the processing of pixels, whether the processing is based on no clip launch or pre-launch clip, as facilitated by processing logic 1307, any results of the processing, such as the processed image, may then be forwarded by processing logic 1307 to the graphics sub-system of the GPU where it is facilitated for displaying on a display screen of the computing device.

Communication/compatibility logic 1311 may be used to facilitate dynamic communication and compatibility between one or more computing devices, such as computing device 1200 of FIG. 12, and any number and type of other computing devices (such as mobile computing device, desktop computer, server computing device, etc.), processing devices (such as central processing unit (CPU), graphics processing unit (GPU), etc.), image capturing devices (such as camera), display elements (such as display component, display device, display screen, etc.), user/context-awareness components and/or identification/verification sensors/devices (such as biometric sensor/detector, scanner, etc.), memory or storage devices, databases and/or data sources (such as data storage device, hard drive, solid-state drive, hard disk, memory card or device, memory circuit, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", and the like, may be referenced interchangeably and include, by way of example, software, hardware, and/or any combination of software and hardware, such as firmware. Further, any use of a particular brand, word, term, phrase, name, and/or acronym, such as "GPU", "CPU", "clipping", "pre-launch", "post-launch", "RenderScript®", "touch swipe", "touch pinch", "touch stretch", "portrait", "landscape", "dimensions", "1D", "2D", "3D", "mobile computing device", etc., should not be read to limit embodiments to software or devices that carry that label in products or in literature external to this document.

It is contemplated that any number and type of components may be added to and/or removed from pre-launch mechanism 1210 to facilitate various embodiments including adding, removing, and/or enhancing certain features. For brevity, clarity, and ease of understanding of pre-launch mechanism 1210, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 14:
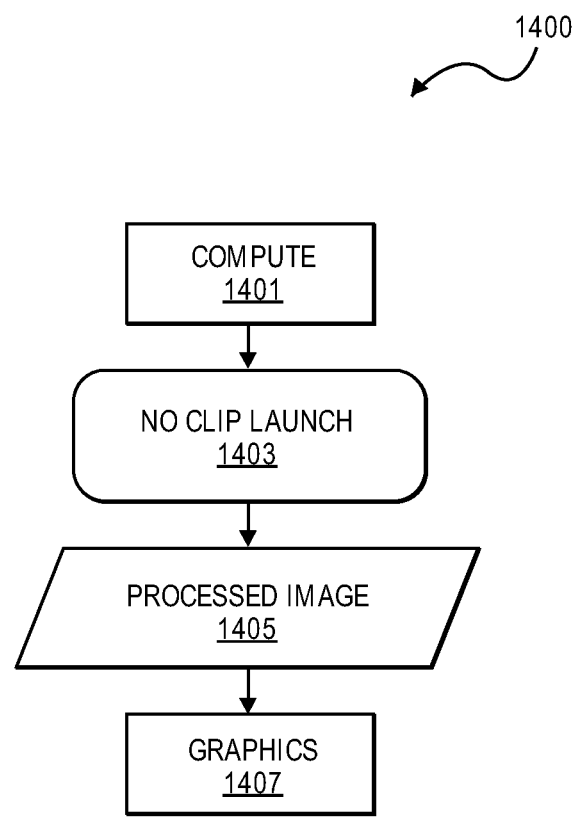
FIG. 14 illustrates a method for facilitating a conventional post-launch clipping process.

FIG. 14 illustrates a method 1400 for facilitating a conventional post-launch clipping process. As illustrated here and aforementioned, method 1400 begins at block 1401, a compute sub-system of a GPU triggers a no clip launch and, at block 1403, the no clip launch-based processing is launched. At block 1405, a processing affecting all the pixels (including invisible or culled pixels, visible pixels, etc.) of the image is launched and performed and subsequently, at block 1407, the processed image is communicated to a graphics sub-system of the GPU.

Figure 15A:
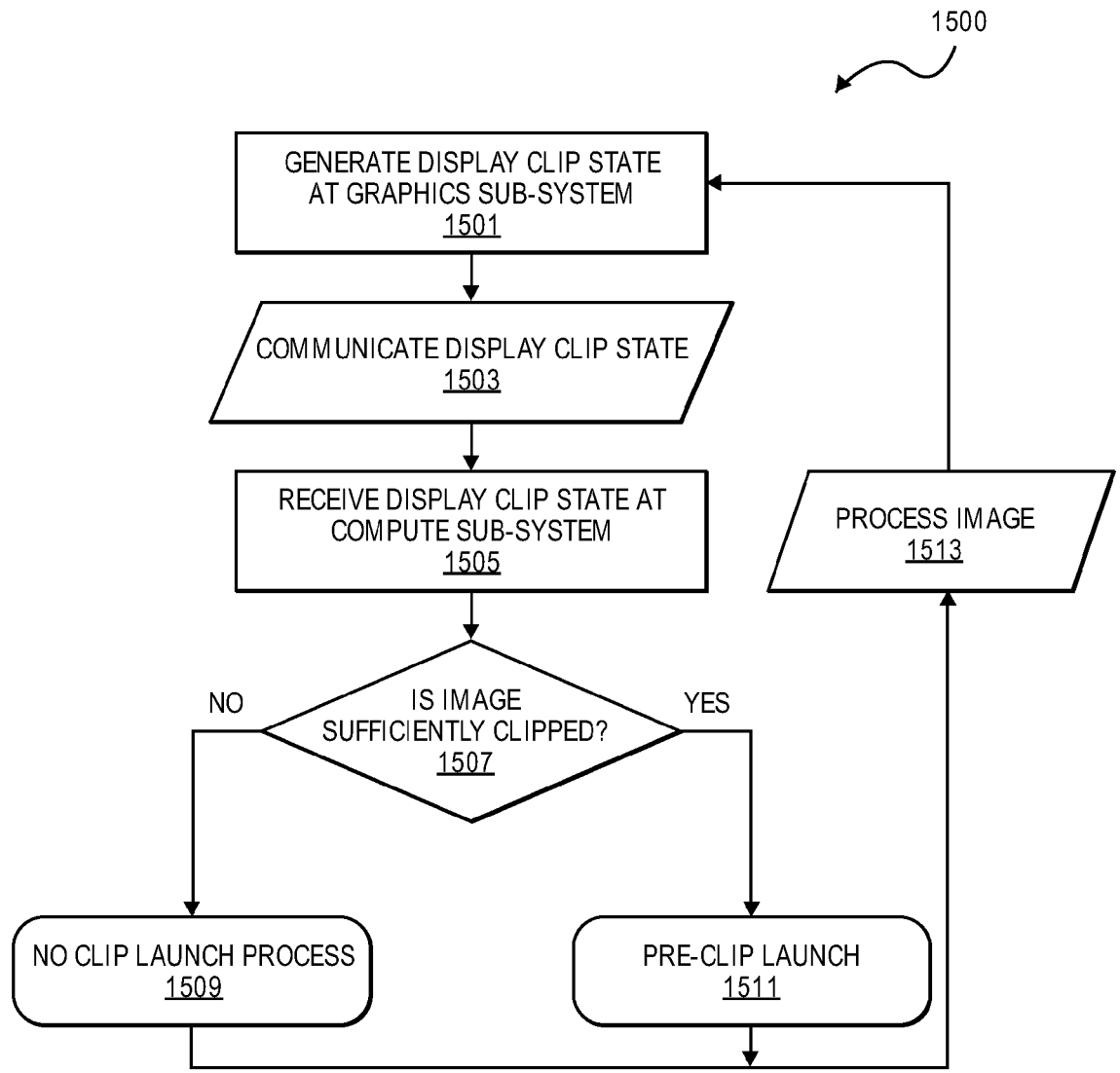
FIG. 15A illustrates a method for facilitating dynamic pre-launch clip process for partially-obscured images at computing devices according to one embodiment.

FIG. 15A illustrates a method 1500 for facilitating dynamic pre-launch clip process for partially-obscured images at computing devices according to one embodiment. Method 1500 may be performed by processing logic that may comprise hardware (e.g., circuitry, dedicated logic, programmable logic, etc.), software (such as instructions run on a processing device), or a combination thereof. In one embodiment, method 1500 may be performed by pre-launch mechanism 1210 of FIGS. 12-13. The processes of method 1500 are illustrated in linear sequences for brevity and clarity in presentation; however, it is contemplated that any number of them can be performed in parallel, asynchronously, or in different orders. For brevity, many of the details discussed with reference to the preceding FIGS. 1-14 may not be discussed or repeated hereafter.

As discussed throughout this document, on computing devices (e.g., mobile computing devices, such as smartphones, tablet computers, etc.), display touch events are fairly dynamic and often trigger repeated image clip events, causing partially-obscured images. Embodiments provide for performing pre-launch clip processing of partially-obscured images as facilitated by method 1500, resulting in improved and appreciable performance gains and preservation of system resources, such as code processing, threads, power, time, and memory, etc.

Method 1500 begins at block 1501 by generating and obtaining display clip state relating to graphics images as triggered by one or more display touch events by the user. For example, this display clip state or state data may be obtained from a graphics sub-system of a GPU of a computing device, such as graphics sub-system 1216 of GPU 1214 of computing device 1200 of FIG. 12. As aforementioned, this state data may be generated in response to a user performing various images transforming acts at the computing device, such as changing an image from portrait to landscape or vice versa, touch swipe, touch pinch, touch stretch, etc., as shown with reference to FIGS. 11A-11D.

In one embodiment, at block 1503, the graphics subsystem may then transfer or forward the state data to a compute sub-system of the computing device and, in one embodiment, at block 1505, the state data is then received at the compute sub-system of the GPU of the computing device, such as compute sub-system 1218 of GPU 1214 of computing device 1200 of FIG. 12. As previously discussed with reference to FIG. 13, this state data may be provided from the graphics sub-system to the compute sub-system on a continuous basis, or a periodic basis based on a predetermined time period, occasionally in response to one or more events, or manually when triggered by one or more components of pre-launch mechanism 1210 of FIG. 12, and/or the like.

At block 1507, a determination is made, based on evaluation and computation of the state data, as to whether the image is sufficiently clipped to trigger a pre-launch clip processing of the image. In one embodiment, as previously discussed with reference to FIG. 13, the evaluation and computation of the state data may include (without limitation) matching of the contents of the state data with a predetermined threshold (e.g., percentage threshold, such as 2%, 5%, 15%, 32%, etc.) to determine whether the partial obscurity of the image is acceptable in terms of, for example, processing of the percentage (and/or the amount and/or the number) of pixels that are regarded as culled or invisible. For example, if the percentage of the culled pixels is acceptably small (such as based on the predetermined threshold, etc.) where the processing such pixels may not require consumption of too much of the resources (e.g., execution threads, time, power, etc.), then, in one embodiment, no clip launch processing of the image may be triggered at block 1509 and the image may be processed at block 1513. The processed image is then provided back to the graphics sub-system of the GPU for further processing at block 1501.

However, if the image is sufficiently clipped where the percentage (and/or the amount and/or the number) of culled or invisible pixels of the image is a rather large, such as exceeding the predetermined threshold (e.g., equal to/greater than 15%, etc.), then, in one embodiment, a pre-launch clip processing of the image may be triggered at block 1511. As discussed throughout this document, in performing pre-launch clip processing of the image, only the visible pixels of the image may be processed while the culled pixels of the image may be ignored and not included in the processing at block 1513. The processed image is then provided back to the graphics sub-system of the GPU for further processing at block 1501. In one embodiment, this processing of fewer pixels via pre-launch clip processing results in engaging fewer processing threads and other resources (e.g., power, time, memory, etc.) of the computing device (e.g., mobile computer, such as a smartphone, tablet computer, etc.), resulting in an overall faster and more efficient performance of the computing device.

Figure 15B:
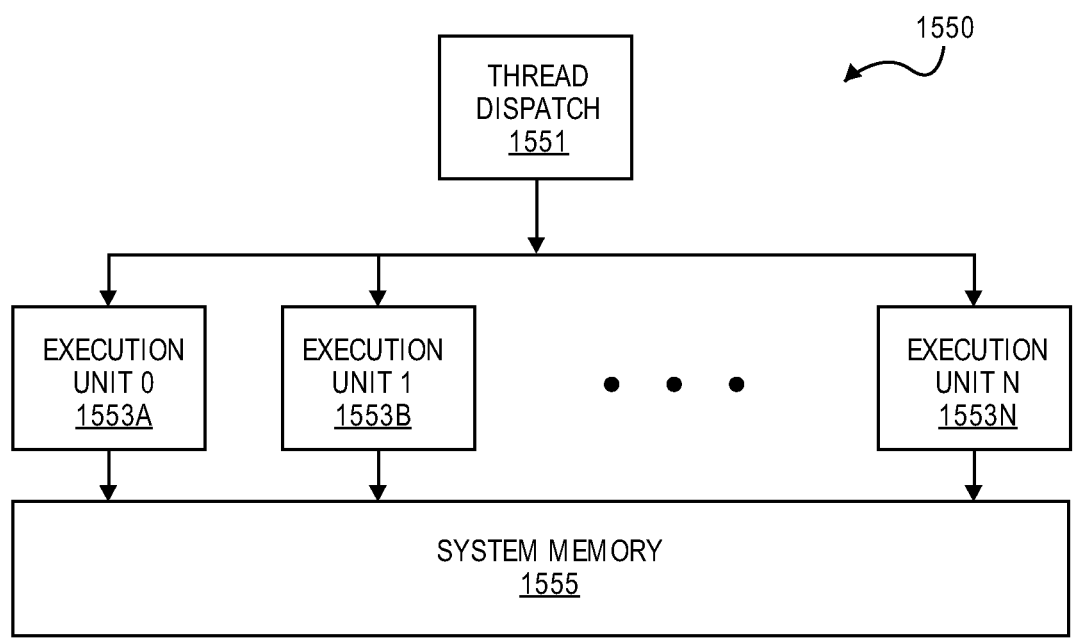
FIG. 15B illustrates a transaction sequence for a compute launch process at a graphics processing unit according to one embodiment.

FIG. 15B illustrates a transaction sequence 1550 for a compute launch process at a graphics processing unit according to one embodiment. Transaction sequence 1550 may be performed by processing logic that may comprise hardware (e.g., circuitry, dedicated logic, programmable logic, etc.), software (such as instructions run on a processing device), or a combination thereof. In one embodiment, transaction sequence 1550 may be performed by pre-launch mechanism 1210 of FIGS. 11-12. The processes of transaction sequence 1550 are illustrated in linear sequences for brevity and clarity in presentation; however, it is contemplated that any number of them can be performed in parallel, asynchronously, or in different orders. For brevity, many of the details discussed with reference to the preceding FIGS. 1-15A may not be discussed or repeated hereafter.

As illustrated, a compute launch process on the GPU may invoke thread dispatch 1551 which may lead to invocation of a kernel, a collection of execution instructions, etc., to perform image processing tasks in parallel as applied to each pixel contained in any of the display clipped extent or the full image that are to be processed. As described with reference to FIG. 15A, in one embodiment, since fewer pixels may be processed when the image processing, as facilitated a block 1513, is based on pre-launch clip, fewer corresponding computation threads, execution units 1553A-1553N, etc., may be needed to be engaged and used.

As illustrated, the launch process may dispatch any number of computation threads concurrently across execution units 1553A-1553N that are in communication with system memory 1555 of the computing device for sharing resources. It is contemplated that system memory 1555 may be similar to or the same as memory 1208 of computing device 1200 of FIG. 12.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate dynamic and efficient pre-launch clipping for partially-obscured images on computing devices, comprising: detection and reception logic to receive state data relating to an image having partially-obscured regions, wherein the image is capable of being processed on a graphics processing unit of a computing device; evaluation and computation logic to evaluate the state data, wherein the evaluation includes computation of at least one of visible pixels and invisible pixels of the image; decision logic to select the visible pixels to be included in processing of the image, wherein the invisible pixels are ignored; and processing logic to process the image based on the visible pixels.

Example 2 includes the subject matter of Example 1, wherein the partially-obscured regions of the image are caused by one or more changes in display orientation of the computing device, wherein the one or more changes include at least one of swiping, pinching, and stretching.

Example 3 includes the subject matter of Example 2, wherein the one or more changes further comprise turning the computing device from a first layout to a second layout, wherein the first and second layouts include at least one of a portrait layout, a landscape layout, and a diagonal layout, wherein the computing device includes a mobile computing device having at least one of a smartphone and a table computer.

Example 4 includes the subject matter of Example 1, wherein the visible pixels comprise noticeable pixels of an obvious part of the partially-obscured regions of the image, wherein the invisible pixels comprise culled pixels of an obscured part of the partially-obscured regions of the image.

Example 5 includes the subject matter of Example 1, wherein the computation further comprises matching the state data with a predefined threshold based on predetermined criteria, wherein the predefined threshold indicates an acceptable percentage of the invisible pixels.

Example 6 includes the subject matter of Example 1, wherein the decision logic is further to: select the visible pixels for the processing of the image: and ignore the invisible pixels for the processing of the image, if a percentage of the invisible pixels equals or is greater than the acceptable percentage of invisible pixels as indicated by the predefined threshold.

Example 7 includes the subject matter of Example 6, wherein the decision logic is further to select the visible pixels and the invisible pixels for the processing of the image, if the percentage of the invisible pixels is less than the acceptable percentage of invisible pixels as indicated by the predefined threshold.

Example 8 includes the subject matter of Example 1, further comprising: a graphics sub-system of the graphics processing unit to observe the state data and forward the state data to a compute sub-system of the graphics processing unit; and the compute sub-system to receive, via the detection and reception logic, the state data from the graphics sub-system.

Some embodiments pertain to Example 9 that includes a method for facilitating dynamic and efficient pre-launch clipping for partially-obscured images on computing devices, comprising: receiving state data relating to an image having partially-obscured regions, wherein the image is capable of being processed on a graphics processing unit of a computing device; evaluating the state data, wherein evaluating includes computation of at least one of visible pixels and invisible pixels of the image; selecting the visible pixels to be included in processing of the image, wherein the invisibles pixel are ignored; and processing the image based on the visible pixels.

Example 10 includes the subject matter of Example 9, wherein the partially-obscured regions of the image are caused by one or more changes in display orientation of the computing device, wherein the one or more changes include at least one of swiping, pinching, and stretching.

Example 11 includes the subject matter of Example 10, wherein the one or more changes further comprise turning the computing device from a first layout to a second layout, wherein the first and second layouts include at least one of a portrait layout, a landscape layout, and a diagonal layout, wherein the computing device includes a mobile computing device having at least one of a smartphone and a table computer.

Example 12 includes the subject matter of Example 9, wherein the visible pixels comprise noticeable pixels of an obvious part of the partially-obscured regions of the image, wherein the invisible pixels comprise culled pixels of an obscured part of the partially-obscured regions of the image.

Example 13 includes the subject matter of Example 9, wherein the computation further comprises matching the state data with a predefined threshold based on predetermined criteria, wherein the predefined threshold indicates an acceptable percentage of the invisible pixels.

Example 14 includes the subject matter of Example 9, further comprising: selecting the visible pixels for the processing of the image; and ignoring the invisible pixels for the processing of the image, if a percentage of the invisible pixels is equals or is greater than the acceptable percentage of invisible pixels as indicated by the predefined threshold.

Example 15 includes the subject matter of Example 14, further comprising selecting the visible pixels and the invisible pixels for the processing of the image, if the percentage of the invisible pixels is less than the acceptable percentage of invisible pixels as indicated by the predefined threshold.

Example 16 includes the subject matter of Example 9, further comprising: observing, via a graphics sub-system of the graphics processing unit, the state data and providing the state data to a compute sub-system of the graphics processing unit; and receiving, via the compute sub-system, the state data from the graphics sub-system.

Example 17 includes at least one machine-readable medium comprising a plurality of instructions, when executed on a computing device, to implement or perform a method or realize an apparatus as claimed in any preceding claims.

Example 18 includes at least one non-transitory or tangible machine-readable medium comprising a plurality of instructions, when executed on a computing device, to implement or perform a method or realize an apparatus as claimed in any preceding claims.

Example 19 includes a system comprising a mechanism to implement or perform a method or realize an apparatus as claimed in any preceding claims.

Example 20 includes an apparatus comprising means to perform a method as claimed in any preceding claims.

Example 21 includes a computing device arranged to implement or perform a method or realize an apparatus as claimed in any preceding claims.

Example 22 includes a communications device arranged to implement or perform a method or realize an apparatus as claimed in any preceding claims.

Some embodiments pertain to Example 23 includes a system comprising a storage device having instructions, and a processor to execute the instructions to facilitate a mechanism to perform one or more operations comprising: receiving state data relating to an image having partially-obscured regions, wherein the image is capable of being processed on a graphics processing unit of a computing device; evaluating the state data, wherein evaluating includes computation of at least one of visible pixels and invisible pixels of the image; selecting the visible pixels to be included in processing of the image, wherein the invisibles pixel are ignored; and processing the image based on the visible pixels.

Example 24 includes the subject matter of Example 23, wherein the partially-obscured regions of the image are caused by one or more changes in display orientation of the computing device, wherein the one or more changes include at least one of swiping, pinching, and stretching.

Example 25 includes the subject matter of Example 24, wherein the one or more changes further comprise turning the computing device from a first layout to a second layout, wherein the first and second layouts include at least one of a portrait layout, a landscape layout, and a diagonal layout, wherein the computing device includes a mobile computing device having at least one of a smartphone and a table computer.

Example 26 includes the subject matter of Example 23, wherein the visible pixels comprise noticeable pixels of an obvious part of the partially-obscured regions of the image, wherein the invisible pixels comprise culled pixels of an obscured part of the partially-obscured regions of the image.

Example 27 includes the subject matter of Example 23, wherein the computation further comprises matching the state data with a predefined threshold based on predetermined criteria, wherein the predefined threshold indicates an acceptable percentage of the invisible pixels.

Example 28 includes the subject matter of Example 23, wherein the one or more operations further comprise: selecting the visible pixels for the processing of the image; and ignoring the invisible pixels for the processing of the image, if a percentage of the invisible pixels equals or is greater than the acceptable percentage of invisible pixels as indicated by the predefined threshold.

Example 29 includes the subject matter of Example 28, wherein the one or more operations further comprise selecting the visible pixels and the invisible pixels for the processing of the image, if the percentage of the invisible pixels is less than the acceptable percentage of invisible pixels as indicated by the predefined threshold.

Example 30 includes the subject matter of Example 23, wherein the one or more operations further comprise: observing, via a graphics sub-system of the graphics processing unit, the state data and providing the state data to a compute sub-system of the graphics processing unit; and receiving, via the compute sub-system, the state data from the graphics sub-system.

Some embodiments pertain to Example 31 includes an apparatus comprising: means for receiving state data relating to an image having partially-obscured regions, wherein the image is capable of being processed on a graphics processing unit of a computing device; means for evaluating the state data, wherein evaluating includes computation of at least one of visible pixels and invisible pixels of the image; means for selecting the visible pixels to be included in processing of the image, wherein the invisibles pixel are ignored; and means for processing the image based on the visible pixels.

Example 32 includes the subject matter of Example 31, wherein the partially-obscured regions of the image are caused by one or more changes in display orientation of the computing device, wherein the one or more changes include at least one of swiping, pinching, and stretching.

Example 33 includes the subject matter of Example 32, wherein the one or more changes further comprise turning the computing device from a first layout to a second layout, wherein the first and second layouts include at least one of a portrait layout, a landscape layout, and a diagonal layout, wherein the computing device includes a mobile computing device having at least one of a smartphone and a table computer.

Example 34 includes the subject matter of Example 31, wherein the visible pixels comprise noticeable pixels of an obvious part of the partially-obscured regions of the image, wherein the invisible pixels comprise culled pixels of an obscured part of the partially-obscured regions of the image.

Example 35 includes the subject matter of Example 31, wherein the computation further comprises means for matching the state data with a predefined threshold based on predetermined criteria, wherein the predefined threshold indicates an acceptable percentage of the invisible pixels.

Example 36 includes the subject matter of Example 31, further comprising: means for selecting the visible pixels for the processing of the image; and means for ignoring the invisible pixels for the processing of the image, if a percentage of the invisible pixels equals or is greater than the acceptable percentage of invisible pixels as indicated by the predefined threshold.

Example 37 includes the subject matter of Example 36, further comprising means for selecting the visible pixels and the invisible pixels for the processing of the image, if the percentage of the invisible pixels is less than the acceptable percentage of invisible pixels as indicated by the predefined threshold.

Example 38 includes the subject matter of Example 31, further comprising: means for observing, via a graphics sub-system of the graphics processing unit, the state data and providing the state data to a compute sub-system of the graphics processing unit; and means for receiving, via the compute sub-system, the state data from the graphics sub-system.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:

detection and reception hardware logic of a pre-launch mechanism to receive display clip state relating to an image having partially-obscured regions, wherein the image is capable of being processed on a graphics processing unit of a computing device;

evaluation and computation hardware logic of the pre-launch mechanism to evaluate the display clip state, wherein the evaluation includes computation of at least one of visible pixels and invisible pixels of the image if any invisible pixels are present to determine whether the invisible pixels exceed a predetermined threshold, wherein the predetermined threshold represents a portion of the image that is acceptable as being culled or occupied by the invisible pixels;

decision hardware logic of the pre-launch mechanism to trigger launching of a clip of the image for pre-launch clipping by selecting to include the visible pixels in the clip of the image and exclude the invisible pixels from the clip of the image; and processing hardware logic of the pre-launch mechanism to process the clip of the image having the visible pixels.

2. The apparatus of claim 1, wherein the partially-obscured regions of the image are caused by one or more changes in display orientation of the computing device, wherein the one or more changes include at least one of swiping, pinching, and stretching.

3. The apparatus of claim 2, wherein the one or more changes further comprise turning the computing device from a first layout to a second layout, wherein the first and second layouts include a portrait layout, a landscape layout, or a diagonal layout, wherein the computing device includes a mobile computing device having at least one of a smartphone and a table computer.

4. The apparatus of claim 1, wherein the visible pixels comprise noticeable pixels of an obvious part of the partially-obscured regions of the image, wherein the invisible pixels comprise culled pixels of an obscured part of the partially-obscured regions of the image.

5. The apparatus of claim 1, wherein the computation further comprises matching the display clip state with the predefined threshold based on predetermined criteria, wherein the predefined threshold indicates an acceptable percentage of the invisible pixels.

6. The apparatus of claim 1, wherein the decision logic is further to:
   select the visible pixels for the processing of the image; and
   ignore the invisible pixels for the processing of the image, if a percentage of the invisible pixels equals or is greater than the acceptable percentage of invisible pixels as indicated by the predefined threshold.

7. The apparatus of claim 6, wherein the decision logic is further to select the visible pixels and the invisible pixels for the processing of the image, if the percentage of the invisible pixels is less than the acceptable percentage of invisible pixels as indicated by the predefined threshold.

8. The apparatus of claim 1, further comprising:
   a graphics sub-system of the graphics processing unit to observe the display clip state and forward the display clip state to a compute sub-system of the graphics processing unit; and
   the compute sub-system to receive, via the detection and reception hardware logic, the display clip state from the graphics sub-system.

9. A method comprising:
   receiving with detection and reception hardware logic of a pre-launch mechanism display clip state relating to an image having partially-obscured regions, wherein the image is capable of being processed on a graphics processing unit of a computing device;
   evaluating with evaluation and computation hardware logic of the pre-launch mechanism the display clip state, wherein evaluating includes computation of at least one of visible pixels and invisible pixels of the image if any invisible pixels are present to determine whether the invisible pixels exceed a predetermined threshold, wherein the predetermined threshold represents a portion of the image that is acceptable as being culled or occupied by the invisible pixels;
   trigger with decision hardware logic of the pre-launch mechanism launching of a clip of the image for pre-launch clipping by selecting to include the visible pixels in the clip of the image and exclude the invisible pixels from the clip of the image; and
   processing with processing hardware logic of the pre-launch mechanism the clip of the image having the visible pixels.

10. The method of claim 9, wherein the partially-obscured regions of the image are caused by one or more changes in display orientation of the computing device, wherein the one or more changes include at least one of swiping, pinching, and stretching.

11. The method of claim 10, wherein the one or more changes further comprise turning the computing device from a first layout to a second layout, wherein the first and second layouts include a portrait layout, a landscape layout, or a diagonal layout, wherein the computing device includes a mobile computing device having at least one of a smartphone and a table computer.

12. The method of claim 9, wherein the visible pixels comprise noticeable pixels of an obvious part of the partially-obscured regions of the image, wherein the invisible pixels comprise culled pixels of an obscured part of the partially-obscured regions of the image.

13. The method of claim 9, wherein the computation further comprises matching the display clip state with the predefined threshold based on predetermined criteria, wherein the predefined threshold indicates an acceptable percentage of the invisible pixels.

14. The method of claim 9, further comprising:
   selecting the visible pixels for the processing of the image; and
   ignoring the invisible pixels for the processing of the image, if a percentage of the invisible pixels equals or is greater than the acceptable percentage of invisible pixels as indicated by the predefined threshold.

15. The method of claim 14, further comprising selecting the visible pixels and the invisible pixels for the processing of the image, if the percentage of the invisible pixels is less than the acceptable percentage of invisible pixels as indicated by the predefined threshold.

16. The method of claim 9, further comprising:
   observing, via a graphics sub-system of the graphics processing unit, the display clip state and providing the display clip state to a compute sub-system of the graphics processing unit; and
   receiving, via the compute sub-system, the display clip state from the graphics sub-system.

17. At least one non-transitory machine-readable medium comprising a plurality of instructions, executed on a computing device, to facilitate the computing device to perform one or more operations comprising:
   receiving with detection and reception hardware logic of a pre-launch mechanism display clip state relating to an image having partially-obscured regions, wherein the image is capable of being processed on a graphics processing unit of a computing device;
   evaluating with evaluation and computation hardware logic of the pre-launch mechanism the display clip state, wherein evaluating includes computation of at least one of visible pixels and invisible pixels of the image if any invisible pixels are present to determine whether the invisible pixels exceed a predetermined threshold, wherein the predetermined threshold represents a portion of the image that is acceptable as being culled or occupied by the invisible pixels;
   trigger with decision hardware logic of the pre-launch mechanism launching of a clip of the image for pre-launch clipping by selecting to include the visible pixels in the clip of the image and exclude the invisible pixels from the clip of the image; and
   processing with processing hardware logic of the pre-launch mechanism the clip of the image having the visible pixels.

18. The non-transitory machine-readable medium of claim 17, wherein the partially-obscured regions of the image are caused by one or more changes in display orientation of the computing device, wherein the one or more changes include at least one of swiping, pinching, and stretching.

19. The non-transitory machine-readable medium of claim 18, wherein the one or more changes further comprise turning the computing device from a first layout to a second layout, wherein the first and second layouts include a portrait layout, a landscape layout, or a diagonal layout, wherein the computing device includes a mobile computing device having at least one of a smartphone and a table computer.

20. The non-transitory machine-readable medium of claim 17, wherein the visible pixels comprise noticeable pixels of an obvious part of the partially-obscured regions of the image, wherein the invisible pixels comprise culled pixels of an obscured part of the partially-obscured regions of the image.

21. The non-transitory machine-readable medium of claim 17, wherein the computation further comprises matching the display clip state with the predefined threshold based on predetermined criteria, wherein the predefined threshold indicates an acceptable percentage of the invisible pixels.

22. The non-transitory machine-readable medium of claim 17, wherein the one or more operations further comprise:
   selecting the visible pixels for the processing of the image; and
   ignoring the invisible pixels for the processing of the image, if a percentage of the invisible pixels equals or is greater than the acceptable percentage of invisible pixels as indicated by the predefined threshold.

23. The non-transitory machine-readable medium of claim 17, wherein the one or more operations further comprise selecting the visible pixels and the invisible pixels for the processing of the image, if the percentage of the invisible pixels is less than the acceptable percentage of invisible pixels as indicated by the predefined threshold.

24. The non-transitory machine-readable medium of claim 17, wherein the one or more operations further comprise:
   observing, via a graphics sub-system of the graphics processing unit, the display clip state and providing the display clip state to a compute sub-system of the graphics processing unit; and
   receiving, via the compute sub-system, the display clip state from the graphics sub-system.

\* \* \* \* \*